(12) United States Patent
Hanashima et al.

(10) Patent No.: US 11,592,156 B2
(45) Date of Patent: *Feb. 28, 2023

(54) DIFFUSER PLATE, DESIGNING METHOD OF DIFFUSER PLATE, MANUFACTURING METHOD OF DIFFUSER PLATE, DISPLAY DEVICE, PROJECTION DEVICE, AND LIGHTING DEVICE

(71) Applicant: DEXERIALS CORPORATION, Tokyo (JP)

(72) Inventors: Naoki Hanashima, Tokyo (JP); Akio Takada, Tokyo (JP); Kazuyuki Shibuya, Tokyo (JP); Yusuke Matsuno, Tokyo (JP)

(73) Assignee: DEXERIALS CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/396,116

(22) Filed: Aug. 6, 2021

(65) Prior Publication Data

US 2021/0364147 A1 Nov. 25, 2021

Related U.S. Application Data

(63) Continuation of application No. 15/770,816, filed as application No. PCT/JP2016/079345 on Oct. 3, 2016, now Pat. No. 11,125,413.

(30) Foreign Application Priority Data

Oct. 29, 2015 (JP) ................................. 2015-213465
Jun. 20, 2016 (JP) ................................. 2016-121332

(51) Int. Cl.
*F21V 5/02* (2006.01)
*G02B 1/115* (2015.01)
(Continued)

(52) U.S. Cl.
CPC ................ *F21V 5/02* (2013.01); *F21V 5/004* (2013.01); *G02B 1/115* (2013.01); *G02B 1/118* (2013.01);
(Continued)

(58) Field of Classification Search
CPC ........... F21V 5/02; F21V 5/004; G02B 1/115; G02B 1/118; G02B 3/0006; G02B 3/0043;
(Continued)

(56) References Cited

U.S. PATENT DOCUMENTS 9,470,393 B2 * 10/2016 Hong ................... G02B 5/0215
2004/0130790 A1 7/2004 Sales
(Continued)

FOREIGN PATENT DOCUMENTS

CN 1266254 A 9/2000
CN 1603908 A 4/2005
(Continued)

OTHER PUBLICATIONS

May 9, 2019, European Search Report issued for related EP Application No. 16859488.5.
(Continued)

*Primary Examiner* — Andrew J Coughlin
*Assistant Examiner* — Jessica M Apenteng
(74) *Attorney, Agent, or Firm* — Paratus Law Group, PLLC

(57) ABSTRACT

There is provided a method to manufacture a diffuser plate with better productivity and exhibiting an excellent diffusion property and having excellent durability with respect to light having large coherence, the microlens array diffuser plate including: a microlens group positioned on a surface of a transparent substrate. The diffuser plate includes two or more unit cells that are continuously set in array, the unit cell includes a plurality of microlenses positioned on the surface
(Continued)

of the transparent substrate, and ridge lines between the microlenses adjacent to each other are nonparallel to each other, and are nonparallel to the transparent substrate.

22 Claims, 19 Drawing Sheets

(51) Int. Cl.
      *G02B 1/118*     (2015.01)
      *G03B 21/14*     (2006.01)
      *G02B 3/00*     (2006.01)
      *G03B 21/625*     (2014.01)
      *F21V 5/00*     (2018.01)
      *G02B 5/02*     (2006.01)

(52) U.S. Cl.
      CPC ......... *G02B 3/0006* (2013.01); *G02B 3/0043* (2013.01); *G02B 5/02* (2013.01); *G02B 5/0221* (2013.01); *G03B 21/14* (2013.01); *G03B 21/625* (2013.01)

(58) Field of Classification Search
      CPC ........ G02B 5/02; G02B 5/0221; G03B 21/14; G03B 21/625
      See application file for complete search history.

(56) References Cited

U.S. PATENT DOCUMENTS

| | | |
|---|---|---|
| 2004/0223097 A1 | 11/2004 | Kamijo |
| 2005/0083456 A1 | 4/2005 | Yoshii |
| 2007/0070507 A1* | 3/2007 | Yee ...................... G02B 3/0031 359/622 |
| 2008/0186713 A1* | 8/2008 | Takayama .............. G02B 3/005 362/297 |
| 2010/0053954 A1 | 3/2010 | Chao et al. |
| 2010/0316959 A1* | 12/2010 | Gates ............... B29D 11/00365 359/619 |
| 2011/0069249 A1* | 3/2011 | Shiau .................. G02B 6/0053 362/609 |
| 2015/0293271 A1* | 10/2015 | Miyasaka ........... G02B 5/0268 353/38 |

FOREIGN PATENT DOCUMENTS

| | | |
|---|---|---|
| CN | 1790065 A | 6/2006 |
| CN | 104871043 A | 8/2015 |
| JP | S59-208536 A | 11/1984 |
| JP | H03-192232 A | 8/1991 |
| JP | H08-295538 A | 11/1996 |
| JP | 2003-287603 A | 10/2003 |
| JP | 2004-287372 A | 10/2004 |
| JP | 2005-274938 A | 10/2005 |
| JP | 2007-108400 A | 4/2007 |
| JP | 2014-102311 A | 6/2014 |
| JP | 2015-057632 A | 3/2015 |
| WO | WO 02/10804 A1 | 2/2002 |
| WO | WO 2014/045147 A1 | 3/2014 |

OTHER PUBLICATIONS

Feb. 18, 2020, Japanese Office Action issued for related JP Application No. 2016-121332.
Apr. 3, 2020, Chinese Office Action issued for related CN Application No. 201680063025.3.
Dec. 8, 2020, Japanese Office Action issued for related JP Application No. 2016-121332.
Feb. 22, 2021, Chinese Office Action issued for related CN application No. 201680063025.3.
Jan. 18, 2022, European Communication issued for related EP Application No. 16859488.5.

* cited by examiner

HALF LENS PORTION

HALF LENS PORTION

INCOMING LIGHT DIAMETER = 200 μm

INCOMING LIGHT DIAMETER = 300 μm

INCOMING LIGHT DIAMETER = 650 μm

INCOMING LIGHT DIAMETER = 650 μm

INCOMING LIGHT DIAMETER = 1000 μm

INCOMING LIGHT DIAMETER = 1500 μm

INCOMING LIGHT DIAMETER = 2000 μm

FIG. 18

| | VERTEX-TO-VERTEX DISTANCE | RADIUS OF CURVATURE | DIFFUSION FULL ANGLE (FULL WIDTH AT HALF MAXIMUM) | ATTENUATION WIDTH | ATTENUATION RATE |
|---|---|---|---|---|---|
| A | 89 μm±35 μm (89 μm±39%) | 300 μm±30 μm (300 μm±10%) | 4.0 DEGREES | 2.3 DEGREES | 0.57 |
| B | 82 μm±46 μm (82 μm±56%) | 300 μm±30 μm (300 μm±10%) | 3.5 DEGREES | 2.6 DEGREES | 0.74 |
| C | 75 μm±57 μm (75 μm±76%) | 300 μm±30 μm (300 μm±10%) | 3.2 DEGREES | 3.0 DEGREES | 0.94 |
| D | 89 μm±36 μm (89 μm±40%) | 300 μm±60 μm (300 μm±20%) | 4.0 DEGREES | 2.9 DEGREES | 0.73 |
| E | 81 μm±46 μm (81 μm±57%) | 300 μm±60 μm (300 μm±20%) | 3.3 DEGREES | 3.2 DEGREES | 0.97 |
| F | 74 μm±57 μm (74 μm±77%) | 300 μm±60 μm (300 μm±20%) | 3.1 DEGREES | 3.5 DEGREES | 1.13 |

FIG. 21

| | VERTEX-TO-VERTEX DISTANCE | RADIUS OF CURVATURE | DIFFUSION FULL ANGLE (FULL WIDTH AT HALF MAXIMUM) | ATTENUATION WIDTH | ATTENUATION RATE |
|---|---|---|---|---|---|
| G | 15 μm ± 10 μm (15 μm ± 67%) | 22 μm ± 2.2 μm (22 μm ± 10%) | 18.6 DEGREES | 11 DEGREES | 0.65 |
| H | 14 μm ± 9 μm (14 μm ± 64%) | 22 μm ± 2.2 μm (22 μm ± 10%) | 17.4 DEGREES | 10 DEGREES | 0.57 |
| I | 13 μm ± 9 μm (13 μm ± 69%) | 22 μm ± 2.2 μm (22 μm ± 10%) | 16.2 DEGREES | 9 DEGREES | 0.55 |

DIFFUSER PLATE, DESIGNING METHOD OF DIFFUSER PLATE, MANUFACTURING METHOD OF DIFFUSER PLATE, DISPLAY DEVICE, PROJECTION DEVICE, AND LIGHTING DEVICE

CROSS REFERENCE TO PRIOR APPLICATION

This application is a continuation of U.S. patent application Ser. No. 15/770,816 (filed on Apr. 25, 2018), which is a National Stage Patent Application of PCT/JP2016/079345 (filed on Oct. 3, 2016) under 35 U.S.C. § 371, which claims priority to Japanese Patent Application Nos. 2015-213465 (filed on Oct. 29, 2015) and 2016-121332 (filed on Jun. 20, 2016), which are all hereby incorporated by reference in their entirety.

TECHNICAL FIELD

The present invention relates to a diffuser plate, a designing method of the diffuser plate, a manufacturing method of the diffuser plate, a display device, a projection device, and a lighting device.

BACKGROUND ART

A diffuser plate that scatters incoming light to various directions is widely utilized in various devices, for example, a display device such as a display, a projection device such as a projector, and various types of lighting devices. An incoming light diffusing mechanism in this diffuser plate is roughly classified into a mechanism that utilizes light refraction resulting from the surface shape of the diffuser plate and a mechanism that utilizes scattering by a substance existing inside a bulk body and having different refractive index from the circumference. One of the diffuser plates which utilize the light refraction resulting from the surface shape is what is called a microlens array diffuser plate including a plurality of microlenses having sizes of approximately several tens of micrometers and located on the surface of the bulk body.

For a microlens array diffuser plate, various methods of suppressing occurrence of diffracted light by making the lens shape or lens location irregular have been proposed as in Patent Literature 1 and Patent Literature 2 below, for example. Patent Literature 1 below discloses a diffuser plate for a reticle, and such a diffuser plate is designed to have variations in pitches and heights of microlenses. Specifically, Patent Literature 1 below discloses that a microlens pitch P is set at 8 $\mu m \leq P \leq 30$ $\mu m$ and a microlens height H is set at $0.01 \times P \leq H \leq 0.1 \times P$. In addition, Patent Literature 2 below discloses a microlens array in which a plurality of microlenses are located irregularly, and discloses that boundary regions of the plurality of microlenses are composed of a surface of a curvature having a different sign from that of a plane curvature of the microlenses.

In the case of actually manufacturing a structure of irregular location as described above, it is general to perform drawing by laser or an electron beam in production of a transfer mold or a photomask. On this occasion, in the case where the entire surface of a drawing region is a pattern having no repetition, there is a problem in that the amount of data becomes enormous. In addition, also when evaluating a drawn product, there is also a problem in that the production cost increases, such as, for example, requiring an enormous time for overall evaluation as a result of an inability to narrow down evaluation spots because the pattern has no repetition.

In order to resolve the problems in productivity as described above, Patent Literature 3 below, for example, discloses a manufacturing method of a focusing screen that performs an exposure of a large area by a step and repeat method using a reticle pattern composed of a random pattern. This Patent Literature 3 mentions preventing the pattern on the peripheral portion of the reticle from becoming discontinuous at joints. In addition, this Patent Literature 3 also mentions suppression of diffracted light components while paying attention to functional properties as a focus plate, such as bokeh and brightness.

CITATION LIST

Patent Literature

Patent Literature 1: JP H3-192232A
Patent Literature 2: JP 2007-108400A
Patent Literature 3: JP S59-208536A

SUMMARY OF INVENTION

Technical Problem

Here, a focusing screen (that is, a focus plate) manufactured by a manufacturing method as disclosed in Patent Literature 3 above can achieve desired properties in the case where light enters across a wide region of the focus plate. However, if an attempt is made to apply such a manufacturing method to a microlens array diffuser plate, there is a problem in that it is difficult to obtain desired diffused light with respect to light that enters into a narrow region like a spot, such as laser light, for example.

In the case where spot-like incoming light as described above enters, particularly in the case where laser light enters, coherence of incoming light increases. Thus, not only the influence of the lens location but also the influence of the boundary portion between lenses is not negligible for suppression of diffracted light components, and in addition, only a lens portion existing in an irradiated spot exerts an influence upon outgoing light. From these perspectives, optimization of a microlens array structure different from the focus plate is important. Further, in order to retain durability even for high light intensity density in the spot, it is important to form the whole diffuser plate including the lens portion by using an appropriate material. However, Patent Literature 3 above fails to disclose an influence exerted by restrictions in the manufacturing process resulting from the material of the diffuser plate upon the microlens structure.

Therefore, the present invention was made in view of above-described problems, and an object of the present invention is to provide a diffuser plate that exhibits an excellent diffusion property, has excellent durability with respect to light having large coherence, and can be manufactured with better productivity, a designing method of the diffuser plate, and a manufacturing method of the diffuser plate, as well as a display device, a projection device, and a lighting device in which such a diffuser plate is used.

Solution to Problem

To solve the above-described problem, according to an aspect of the present invention, there is provided a microlens array diffuser plate including a microlens group positioned on a surface of a transparent substrate. The diffuser plate includes two or more unit cells that are continuously set in array, the unit cell includes a plurality of microlenses positioned on the surface of the transparent substrate, and ridge lines between the microlenses adjacent to each other are nonparallel to each other, and are nonparallel to the transparent substrate.

It is preferable that a vertex-to-vertex distance of the microlenses that are adjacent to each other and that constitute the unit cell is included in a range of ±60% from an average value, and a radius of curvature of each of the microlenses that constitute the unit cell is included in a range of ±20% from an average value.

It is preferable that, when expressing a variation degree from an average value of vertex-to-vertex distances of the microlenses that are adjacent to each other and that constitute the unit cell as $\sigma_p$, and expressing a variation degree from an average value of radii of curvature of the microlenses that are adjacent to each other and that constitute the unit cell as $\sigma_R$, (Expression 1) below is obtained.

[Math. 1]

$$\frac{1}{2}\left[\frac{(1+\sigma_p)}{(1-\sigma_R)} - \frac{(1-\sigma_p)}{(1+\sigma_R)}\right] < 0.9 \quad \text{(Expression 1)}$$

It is preferable that a length of a diagonal line of the unit cell is smaller than or equal to 3 mm.

It is preferable that a length of at least one of sides of the unit cell is an integer multiple of an average pitch of the microlenses included in the unit cell.

It is preferable that the number of microlenses included in the unit cell is at least 9 or more.

It is preferable that, in the unit cell, a boundary portion between the microlenses adjacent to each other is not flat.

It is preferable that a half lens is arranged in at least part of the boundary portion.

The microlenses may have polygonal shapes.

It is preferable that the microlenses are concave lenses.

The transparent substrate may be made of an inorganic material.

The inorganic material may be glass containing silicon as a principal component, in which an alkaline component content is less than or equal to 20%.

The diffuser plate may include an antireflection layer on a surface of the microlenses and a surface of the transparent substrate on which the microlens group is not arranged.

The antireflection layer may be a multilayered structure composed of $Nb_2O_5$ and $SiO_2$.

The antireflection layer provided on the surface of the microlenses may be an antireflection structure composed of concavities and convexities that have sizes smaller than or equal to a wavelength of light and that are formed on the surface of the microlens group.

The antireflection structure may be a structure provided anisotropically in the surface of the microlenses, in which the concavities and convexities have pitches of smaller than or equal to 300 nm.

To solve the above-described problem, according to another aspect of the present invention, there is provided a designing method of a microlens array diffuser plate including a microlens group positioned on a surface of a transparent substrate. A radius of curvature of each of microlenses that constitute the microlens group is determined on a basis of a product of a reciprocal of an etching selection ratio between the transparent substrate and a resist and a radius of curvature developed on the resist.

To solve the above-described problem, according to another aspect of the present invention, there is provided a manufacturing method of the diffuser plate, the manufacturing method including: a step of laminating a resist on the transparent substrate; a step of exposing the resist with a gray scale mask having a transmittance distribution; and a step of performing dry etching on the developed transparent substrate by using a fluorine-based gas such that a desired lens shape is obtained.

In the step of performing dry etching, a radius of curvature of each of the microlenses that constitute the microlens group may be determined on a basis of a product of a reciprocal of an etching selection ratio between the transparent substrate and the resist and a radius of curvature developed on the resist.

To solve the above-described problem, according to another aspect of the present invention, there is provided a display device including the diffuser plate.

To solve the above-described problem, according to another aspect of the present invention, there is provided a projection device including the diffuser plate.

To solve the above-described problem, according to another aspect of the present invention, there is provided a lighting device including the diffuser plate.

Advantageous Effects of Invention

According to the present invention as described above, it is possible to manufacture, with better productivity, a diffuser plate that exhibits an excellent diffusion property and has excellent durability with respect to light having large coherence, and it is possible to provide a display device, a projection device, and a lighting device in which such a diffuser plate is used.

BRIEF DESCRIPTION OF DRAWINGS

FIG. 18 is a table illustrating results of examples concerning the diffuser plate according to the second embodiment of the present invention.

FIG. 21 is a table illustrating results of examples concerning the diffuser plate according to the second embodiment of the present invention.

DESCRIPTION OF EMBODIMENTS

Figure 1:
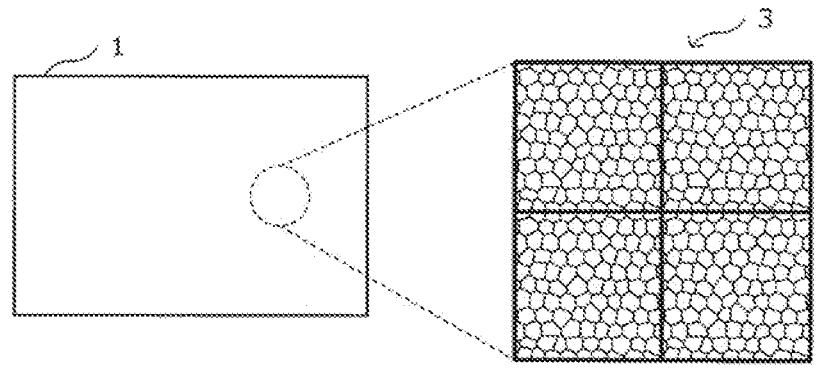
FIG. 1 is an explanatory diagram schematically illustrating a diffuser plate according to a first embodiment of the present invention.

Hereinafter, (a) preferred embodiment(s) of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment (Diffuser Plate)

Hereinbelow, a diffuser plate 1 according to a first embodiment of the present invention will be described in detail with reference to FIG. 1 to FIG. 7B.

Figure 2:
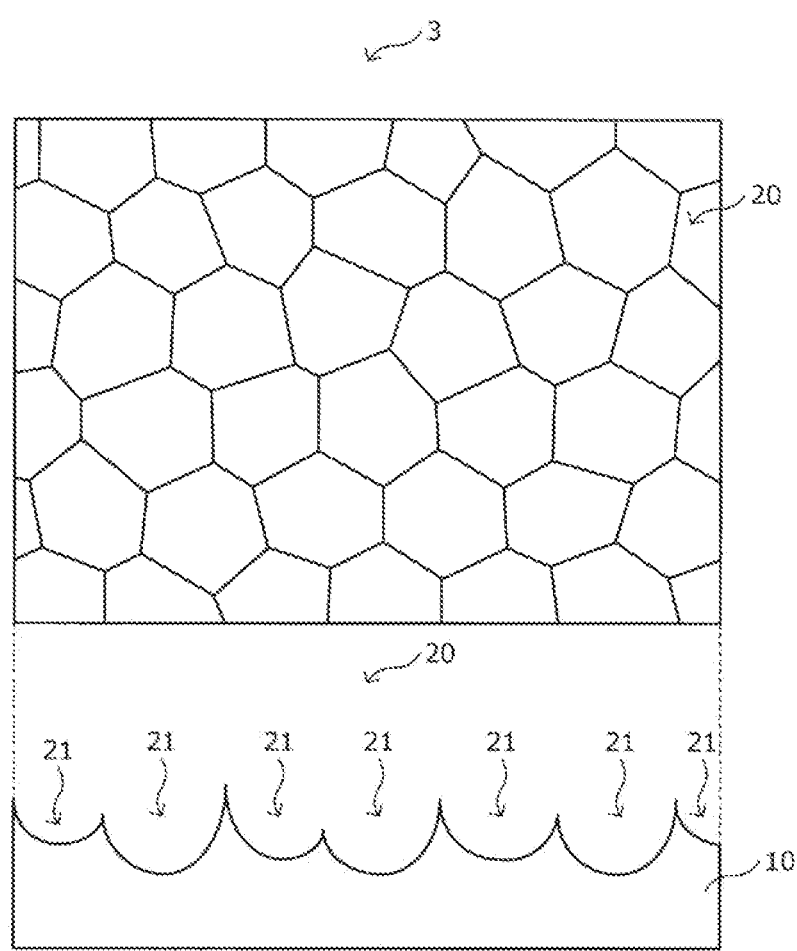
FIG. 2 is an explanatory diagram schematically illustrating part of unit cells that constitute the diffuser plate according to the embodiment.
Figure 4A:
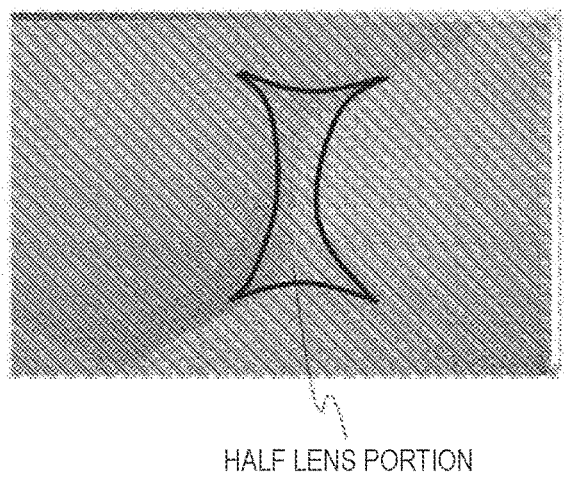
FIG. 4A is an explanatory diagram illustrating an example of a state of a boundary between adjacent microlenses in a unit cell according to the embodiment.
Figure 4B:
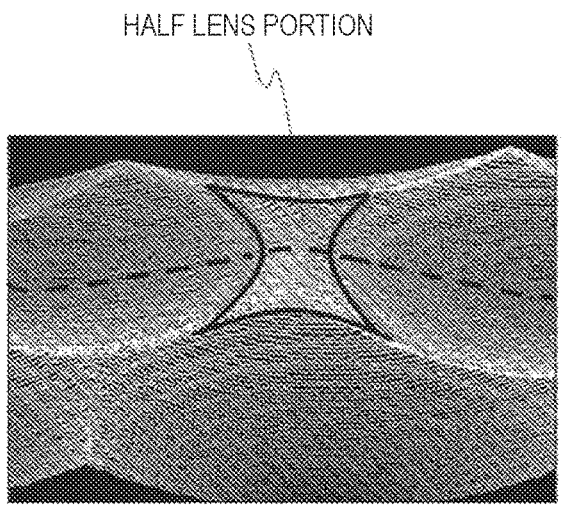
FIG. 4B is an explanatory diagram illustrating an example of a state of a boundary between adjacent microlenses in a unit cell according to the embodiment.
Figure 5:
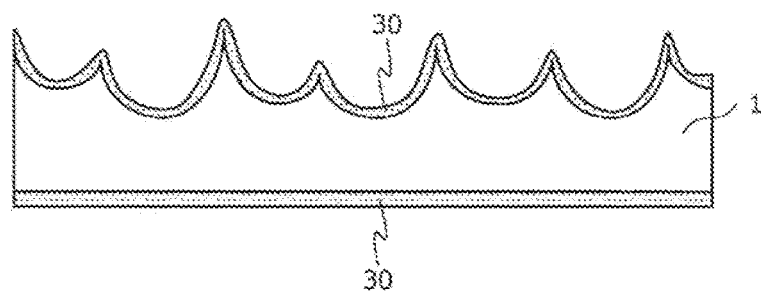
FIG. 5 is an explanatory diagram schematically illustrating a diffuser plate according to the embodiment.

FIG. 1 is an explanatory diagram schematically illustrating the diffuser plate according to the present embodiment. FIG. 2 is an explanatory diagram schematically illustrating part of unit cells that constitute the diffuser plate according to the present embodiment. FIG. 3A to FIG. 4B are explanatory diagrams illustrating examples of a state of the boundary between microlenses adjacent to each other in a unit cell according to the present embodiment. FIG. 5 is an explanatory diagram schematically illustrating the diffuser plate according to the present embodiment. FIG. 6A to FIG. 7B are explanatory diagrams for describing location of unit cells in the diffuser plate according to the present embodiment.

The diffuser plate 1 according to the present embodiment is a microlens array diffuser plate in which a microlens group composed of a plurality of microlenses has been located on a substrate. Such a diffuser plate 1 includes a plurality of unit cells 3 as schematically illustrated in FIG. 1. In addition, between the unit cells 3, a layout pattern (location pattern) of a plurality of microlenses provided in the unit cells 3 is continuous in the sequence direction of the unit cells (in other words, the array sequence direction), as schematically illustrated in the right diagram in FIG. 1.

Here, FIG. 1 presents an illustration using a case where the unit cells 3 that constitute the diffuser plate 1 have a rectangular shape as an example, whilst the shape of the unit cells 3 is not limited to that illustrated in FIG. 1, but should only be a shape that can fill a plane leaving no space, such as an equilateral triangular shape or a regular hexagonal shape, for example.

The number of the unit cells 3 that constitute the diffuser plate 1 according to the present embodiment is not particularly limited, but it is preferable that the diffuser plate 1 includes at least two or more unit cells 3.

FIG. 2 is an explanatory diagram schematically illustrating a structure of part of the unit cells 3 according to the present embodiment. As schematically illustrated in FIG. 2, the unit cell 3 according to the present embodiment has a transparent substrate 10 and a microlens group 20 formed on a surface of the transparent substrate 10.

<Transparent Substrate 10>

The transparent substrate 10 is a substrate made of a material that can be assumed as transparent in a wavelength band of light that enters into the diffuser plate 1 according to the present embodiment. It is preferable that such a substrate is formed using an inorganic material having high light resistance. Examples of the inorganic material having high light resistance can include publicly-known optical glass such as quartz glass, borosilicate glass, and white plate glass, whilst it is preferable to use glass containing silicon as a principal component, in which an alkaline component content is less than or equal to 20 mass %. By using such an inorganic material, it is possible to eliminate degradation in diffusion property of the diffuser plate that would be caused by an alteration in material even in the case of particularly using high-power laser light as incoming light. Although FIG. 2 presents an illustration using a case where the transparent substrate 10 is a rectangle as an example, the shape of the transparent substrate 10 is not limited to the rectangle, but may have an arbitrary shape, depending on the shape of a display device, a projection device, a lighting device, or the like, for example, in which the diffuser plate 1 is provided.

<Microlens Group 20>

The microlens group 20 composed of a plurality of microlenses 21 is formed on a surface of the transparent substrate 10. Since an essential usage of the diffuser plate is to diffuse light, it is preferable for the microlenses 21 that constitute the unit cell 3 that a light outgoing surface is entirely composed of concave lenses, as schematically illustrated at the bottom of FIG. 2. This is because, in the case where the light outgoing surface of the diffuser plate is composed of convex lenses, a light collecting portion is created at a focal point, which can cause problems in installation restrictions and safety. In addition, in the microlens group 20 according to the present embodiment, the respective microlenses 21 are not identical in radius of curvature and vertex-to-vertex pitch, and have variations in a certain range, and thus, the focal length also has a certain distribution. In the case of concave lenses, the focal point becomes an imaginary point, whilst it is preferable that the focal point of each of the microlenses 21 is present in a region adjacent to the transparent substrate 10 that constitutes the diffuser plate 1 since the light intensity density is large at the focal point. This is because, in the case where the focal point of each of the microlenses 21 is present at a place away from the transparent substrate 10, restrictions on an optical system may occur, such as an inability to locate various components at the focal point.

In addition, in the microlens group 20 according to the present embodiment, the respective microlenses 21 that constitute the unit cell 3 are arranged so as to satisfy three conditions indicated below.

(1) The boundaries on the four sides of the unit cell 3 shall be such that discontinuousness does not occur in the pattern in the array sequence.
(2) The planar position and height position of the vertex of each of the microlenses 21 (in other words, the lowest position of the depth of the concave lens) and ridge lines between the microlenses 21 shall be made irregular such that diffraction is sufficiently suppressed.
(3) In order to suppress undiffused transmitted light, a non-lens region shall not exist between the microlenses 21 adjacent to each other.

Here, "irregular" mentioned in (2) above means that regularity concerning the location of the microlenses 21 does not exist practically, in an arbitrary region of the microlens group 20 in the diffuser plate 1. Thus, even if a certain kind of regularity exists in the location of the microlenses 21 at a microscopic region in an arbitrary region, the arbitrary region having no regularity in the location of the microlenses 21 as a whole is assumed to be determined as "irregular".

In the microlens group 20 according to the present embodiment located so as to satisfy the above-described three conditions, all the ridge lines between the microlenses 21 adjacent to each other are nonparallel to each other and are nonparallel to the transparent substrate 10. This is because, in the case where ridge lines parallel to each other exist between the microlenses 21, diffracted light components will be increased.

Here, the "ridge line" shall refer to a linear region, present in an adjacent lens boundary portion to which the plurality of microlenses 21 are adjacent, in which the radius of curvature of the microlenses 21 changes drastically. The width of such a ridge line is usually approximately smaller than or equal to the wavelength of light, and the width of this ridge line is controlled by a process condition such as etching such that diffracted light has an appropriate magnitude. In addition, "nonparallel" shall include a case where at least one of two lines to be determined whether they are parallel or not is a curve.

Figure 3A:
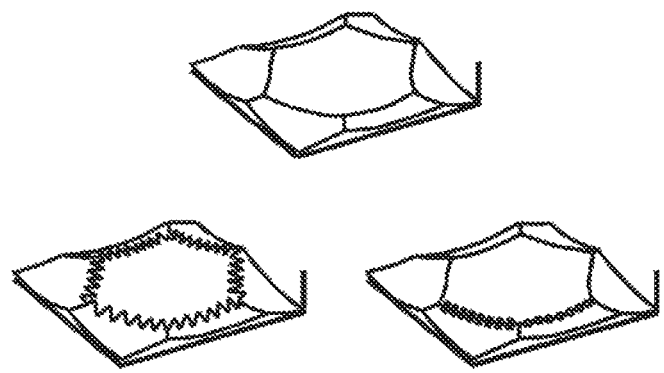
FIG. 3A is an explanatory diagram schematically illustrating examples of a state of a boundary between adjacent microlenses in a unit cell according to the embodiment.
Figure 3B:
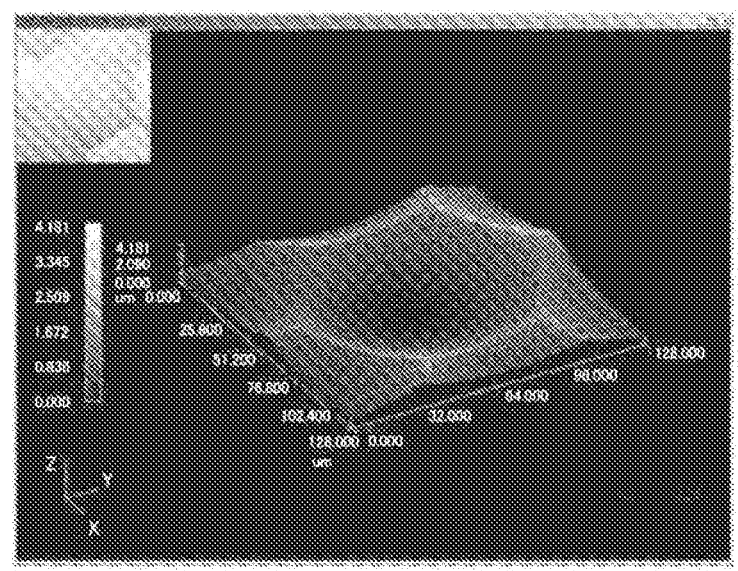
FIG. 3B is an explanatory diagram illustrating an example of a state of a boundary between adjacent microlenses in a unit cell according to the embodiment.

Specifically, a microlens region surrounded by the adjacent microlenses 21 is a polygon as seen from the direction of an optical axis of the microlenses as illustrated in FIG. 3A and FIG. 3B, and each side of the polygon is a curve as seen from a cross-section of the microlens.

In addition, it is preferable that the length of at least one of the sides of the unit cell 3 including the microlenses 21 that satisfy the above-described three conditions is an integer multiple of an average pitch of the microlenses 21 (for example, an average value of vertex-position-to-vertex-position distances of the respective microlenses 21) included in the unit cell 3. In other words, it is preferable that the cycle of the unit cells 3 in the diffuser plate 1 according to the present embodiment is a cycle in which the length of at least one of the sides of the unit cell 3 becomes an integer multiple of the average pitch of the microlenses 21.

In this manner, each of the adjacent microlenses 21 in the microlens group 20 is determined so as to satisfy the conditions as described above, and is not completely random.

Note that, for the ridge lines between the adjacent microlenses 21, it is possible to exercise further ingenuity in order to reduce diffracted light components. For example, it is also possible to make part of the ridge line have an irregular shape rather than a simple straight line or curve as schematically illustrated in FIG. 3A, and to locate a different shape such as a half lens portion on part of the ridge line as illustrated in FIG. 4A and FIG. 4B. Here, the half lens portion in the present embodiment refers to a region in which a change in radius of curvature of the microlenses 21 is relatively gentle such that the width of the ridge line becomes more than or equal to 10 μm. In addition, such a half lens portion also includes a half lens portion whose curvature has different signs in orthogonal directions like a saddle shape. By making the ridge lines between the microlenses 21 have a form as described above, it is possible to make the boundary portions between the microlenses 21 adjacent to each other non-flat to disturb the phase of a diffraction wavefront occurring at the ridge line portion, and to prevent diffracted light components in a specific direction from occurring.

In addition, it is preferable that the number of the microlenses 21 that constitute the unit cell 3 is 3×3=9 or more. This is derived from the fact that, in the case where incoming light equal in diameter to the unit cell 3 enters, the diffusion property does not change with respect to a displacement of an incoming light position if the average pitch of the microlenses 21 is approximately smaller than or equal to ⅓ of the incoming light diameter. The relationship between the average pitch of the microlenses 21 and the incoming light diameter will be described later in detail.

<Antireflection Layer>

An antireflection layer 30 may be formed on a front surface and a rear surface of the diffuser plate 1 according to the present embodiment (in other words, a surface of the microlenses 21 and a surface of the transparent substrate 10 at a side where the microlens group 20 is not arranged) for the purpose of increasing transmittance and preventing reflection stray light or the like, as schematically illustrated in FIG. 5.

It is possible to form such an antireflection layer 30 by using a general dielectric such as $SiO_2$, $Al_2O_3$, $MgF_2$, $CeO_2$, $TiO_2$, $Ta_2O_5$, $Nb_2O_5$, $Y_2O_3$, $Tb_2O_3$, ZnS, or $ZrO_2$, for example, by a publicly-known method such as vapor deposition or sputtering. Here, by forming the antireflection layer 30 using a material having high light resistance, such as $Ta_2O_5$, $Nb_2O_5$, or $SiO_2$, for example, even if incoming light is light having a high optical density, such as high-power laser, it is possible to produce sufficient effects without degradation by such light. On this occasion, by forming the antireflection layer 30 as a multilayered structure in which materials having high light resistance, such as $Ta_2O_5$, $Nb_2O_5$, and $SiO_2$, for example, are laminated one upon another, it is possible to achieve still higher light resistance. The film thickness of such an antireflection layer 30 is not particularly limited, but may be appropriately set depending on the use of the diffuser plate 1, the optical density of incoming light, and the like.

Note that, when forming the antireflection layer 30 on the diffuser plate 1, the film thickness of the antireflection layer 30 may differ at the central portion and the peripheral portion of the microlenses 21 due to the presence of unevenness of the microlenses 21 at the surface of the diffuser plate 1, and thus, it is preferable to form the antireflection layer 30 taking this into consideration. In addition, since the incoming angle of incoming light differs at the central portion and the peripheral portion of the microlenses 21, it is more preferable to exercise ingenuity such as taking an assumed angular range wider than usual by design.

In addition, the antireflection layer 30 provided on the surface of the microlenses 21 may be an antireflection structure formed on the surface of the microlens group 20 (which is also the surface of the microlenses 21) and composed of fine concavities and convexities (the so-called moth-eye structure) having sizes smaller than or equal to the wavelength of light. Since the inclination of the surface of the microlenses 21 becomes large particularly in the case of achieving a diffusion property in which the diffusion angle exceeds 10 degrees, the moth-eye structure in which the dependence of reflectivity on incoming angle is small is advantageous as compared with the multilayered structure described above. From the perspective of reducing stray light and reflection, it is preferable that the above-described antireflection structure is a structure that is provided anisotropically within the surface of the microlenses 21 and has fine concavities and convexities having pitches of smaller than or equal to 300 nm.

<Location of Unit Cells 3>

As is conventionally known, when light enters into a cyclic repetition structure, diffracted light occurs. When expressing the pitch of the repetition structure (repetition cycle) as p, a diffraction order (integer) as m, and the wavelength of incoming light as λ, a diffraction angle θ is given by Expression 101 below.

[Math. 2]

$$\theta = \sin^{-1}\frac{m\lambda}{p}$$ (Expression 101)

In the case of a microlens array diffuser plate as receiving attention in the present embodiment, both of the diffusion effect exerted by lens elements (the microlenses 21) and diffracted light components resulting from the cyclic sequence of the microlenses 21 are superimposed to be outgoing light. The diffracted light components are a discrete distribution relative to angles, and the peak intensities of the diffracted light components become smaller in inverse proportion to the diffraction order m. When becoming smaller than the intensity level of diffused light spread by the lens array, these discrete diffraction components are buried in diffused light and cannot be identified as they are. Therefore, suppression of an adverse effect caused by the diffraction is performed by adding random irregular components to the cyclic location to make the diffraction peak smaller.

In addition, the peak intensity of the diffracted light component also depends on incoming light conditions such as the incoming light diameter. For example, in the case where light with an incoming light diameter having a size approximately the same as the size of the microlenses 21 enters into a microlens 21, only little light enters into a microlens 21 adjacent to the microlens 21 into which the light has entered even if the microlens group 20 is regularly located, so that diffracted light hardly occurs. On the other hand, in the case where incoming light having an incoming light diameter approximately the same as the size of the microlenses 21 enters into a microlens 21, a phenomenon in which the outgoing property changes is likely to occur depending on the relationship between the incoming light axis and the optical axis of the microlens 21.

Figure 6A:
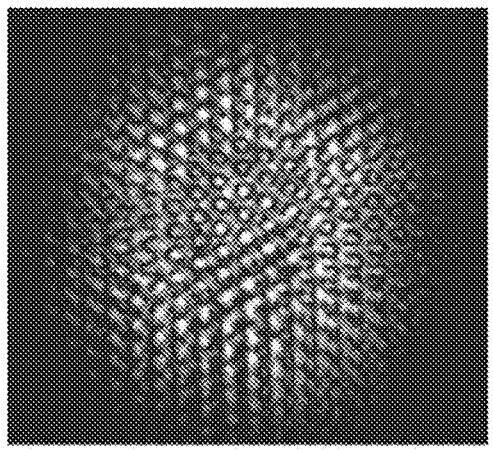
FIG. 6A is an explanatory diagram for describing location of unit cells in the diffuser plate according to the embodiment.
Figure 6B:
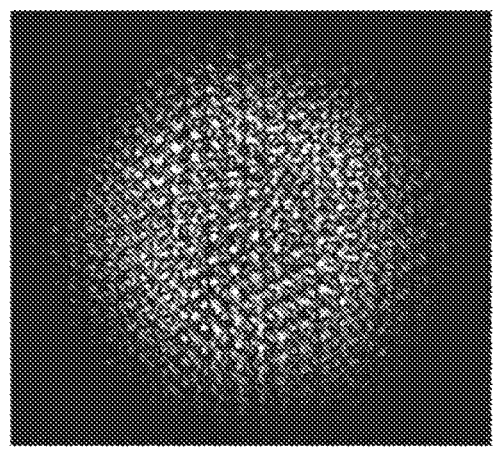
FIG. 6B is an explanatory diagram for describing location of unit cells in the diffuser plate according to the embodiment.
Figure 6C:
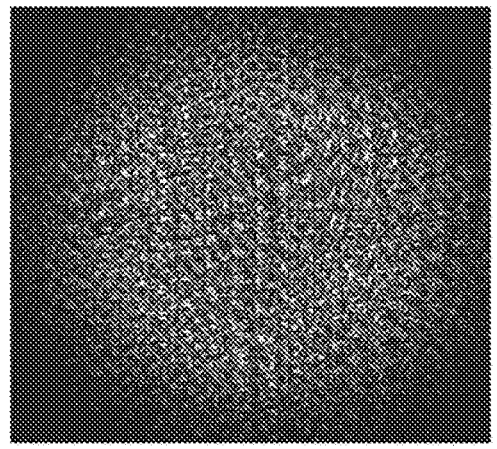
FIG. 6C is an explanatory diagram for describing location of unit cells in the diffuser plate according to the embodiment.

Examples in which the outgoing light distribution of the microlens array having an irregular location was simulated by a commercially-available electromagnetic field simulator are illustrated in FIG. 6A to FIG. 6C. In such simulation, a pitch p of the microlenses 21 (which is also the diameter of the microlenses) in the microlens array is set at 82 μm, and the size of the rectangular microlens array is set at 738 μm×710 μm (the length of the diagonal line: about 1024 μm). Then, how the outgoing light distribution including diffracted light is projected onto a screen which is a detector in the case where the incoming light diameter of light entering into such a microlens array is changed to 200 μm, 300 μm, and 650 μm is verified. In FIG. 6A to FIG. 6C, luminescent spots in the drawings indicate diffracted light caused by the microlens array.

As illustrated in FIG. 6A, since diffracted light luminescent spots in diffused light are enlarged in the case where the size difference between the diameter (82 μm) of the microlenses 21 and the incoming light diameter is relatively small, it is understood that it is preferable to decrease the diameter of the microlenses 21 (or increase the incoming light diameter) as is apparent from FIG. 6B and FIG. 6C. Specifically, by setting the pitch of the microlens array at smaller than or equal to about ⅓ of the incoming light diameter, it is possible to reduce the influence caused by the luminescent spots as described above to a practically negligible level.

On the other hand, when actually manufacturing the microlens array, producing a photomask or mold for transfer is considered. In this case, in general, formation of the shapes of the microlenses 21 is often performed by direct drawing with laser or an electron beam, whilst in order to reduce the amount of data to be produced, a technique like the so-called step and repeat that repeats the unit cell 3 having a relatively small area vertically and horizontally to form an array sequence and enlarges the array sequence to a desired size is also often adopted. When light enters into a microlens array having such an array structure, two types of diffracted light components composed of double repetition structures, one within the unit cells 3 and the other between the unit cells 3, will be produced. With respect to each diffraction angle, the diffraction angle within the unit cells 3 is determined by the pitch of the lens location, and the diffraction angle between the unit cells 3 is determined by the sizes of the unit cells 3.

The diffraction angle resulting from the unit cell array (the diffraction angle between the unit cells 3) is considered. For example, when assuming the pitch of the unit cell as 700 µm and the wavelength of incoming light as 450 nm, the angle (half angle) of first order diffracted light (diffracted light in the case where m=1) is 0.03 degree according to Expression (101) above. Consequently, even in the case where the diffusion angle (half angle) of the diffuser plate is approximately 3 degrees, $(3/0.03)^2 = 10^4$ rays of diffracted light will occur in diffused light. Since the intensity of diffracted light rapidly decreases as the diffraction order m becomes higher (for example, when the diffraction order is m, the peak intensity becomes $(2/\pi)^m$), approximately several tens of diffraction peaks will appear in the diffused light, actually. Hereinbelow, such diffracted light resulting from the unit cell array will be referred to as sub-diffracted light.

On the other hand, each of luminescent spots in diffracted light through the lens array as described earlier (in other words, each of luminescent spots in diffracted light obtained by diffraction within the unit cells 3) are separated further discretely by sub-diffraction peaks obtained by the unit cell array as described above. Consequently, clarity of luminescent spots in the diffused light will be reduced by such sub-diffracted light peaks. A phenomenon in which diffracted light obtained by diffraction within the unit cells 3 (hereinbelow, also referred to as main diffracted light) as described above is separated by sub-diffracted light causes the diffracted light luminescent spots in the diffused light to become smaller as the conditions transition from FIG. 6A to FIG. 6C.

Here, since the diffraction angle obtained by the unit cells is very small, luminescent spots of the sub-diffraction component do not raise any problem in actual use of the diffuser plate 1 according to the present embodiment. Consequently, by causing sub-diffracted light obtained by the unit cells 3 to occur appropriately, it is possible to reduce the peak intensity of main diffracted light as described with reference to FIG. 6A to FIG. 6C.

Figure 7A:
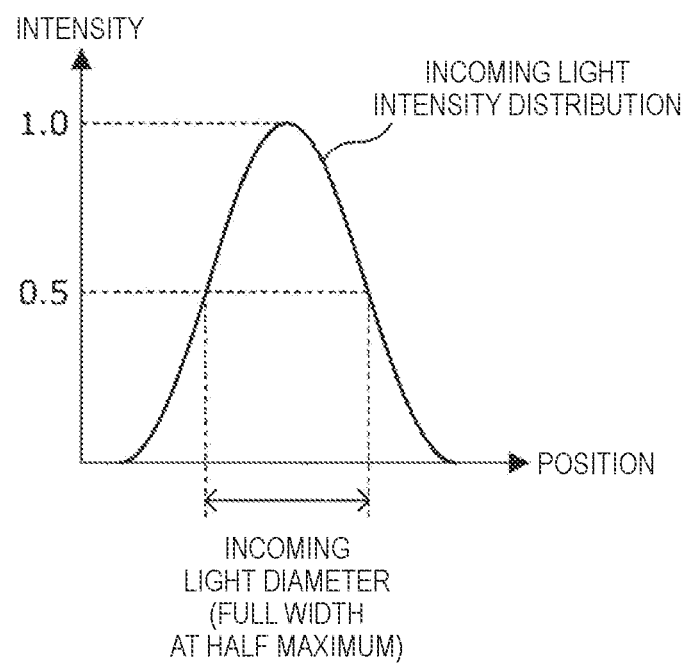
FIG. 7A is an explanatory diagram for describing location of unit cells in the diffuser plate according to the embodiment.
Figure 7B:
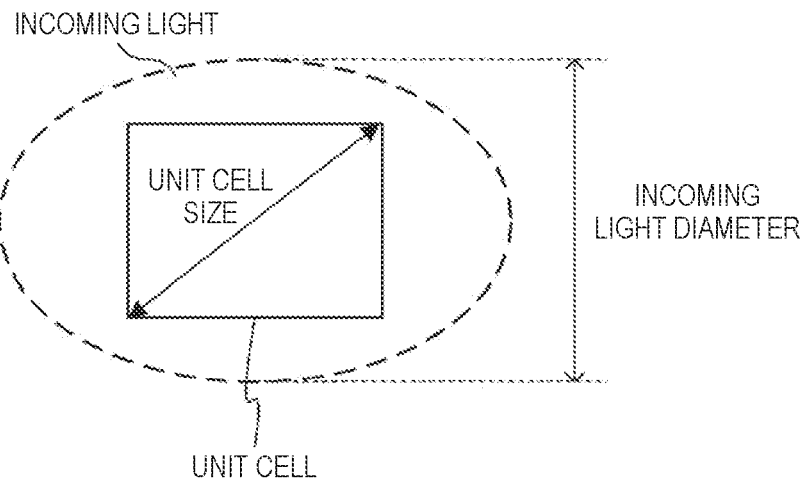
FIG. 7B is an explanatory diagram for describing location of unit cells in the diffuser plate according to the embodiment.

The intensity of sub-diffracted light is determined by the relationship between the unit cells 3 and the magnitude of incoming light. In the case where the unit cell 3 is larger than incoming light, sub-diffracted light resulting from the cyclic structure of the unit cells 3 will not occur in general. Here, considering the full width at half maximum of incoming light intensity as illustrated in FIG. 7A, the diameter in a direction in which such a full width at half maximum is minimized is defined as an "incoming light diameter" as illustrated in FIG. 7B. In addition, the unit cell 3 is assumed as being rectangular such as a rectangle or a square, and the length of the diagonal line of the unit cells 3 is defined as a "unit cell size". On this occasion, if the unit cell size is smaller than the incoming light diameter as illustrated in FIG. 7B, sub-diffracted light resulting from diffraction between the unit cells 3 occurs, and it is possible to reduce the peak intensity of main diffracted light resulting from the lens array (in other words, resulting from diffraction within the unit cells 3).

Here, even if light that enters into the diffuser plate 1 is laser light, it is considered that the incoming light diameter as illustrated in FIG. 7B is at most approximately 3 mm. Consequently, if the unit cell size as illustrated in FIG. 7B is smaller than or equal to 3 mm, it is possible to use the diffuser plate 1 according to the present embodiment for any laser light source.

As described above, the microlens array diffuser plate 1 according to the present embodiment includes two or more unit cells 3, and each of the unit cells 3 has the microlens group 20 composed of the plurality of microlenses 21. In addition, it is characterized in that the microlenses 21 included in each of the unit cells 3 are continuously set in array, the ridge lines between the respective microlenses 21 are nonparallel to each other, and are also nonparallel to the transparent substrate 10. Accordingly, the diffuser plate 1 according to the present embodiment can suppress the diffracted light components in diffused light, and exhibits an excellent diffusion property.

The diffuser plate 1 according to the present embodiment has been described above in detail with reference to FIG. 1 to FIG. 7B.

(Manufacturing Method of Diffuser Plate)

Figure 8:
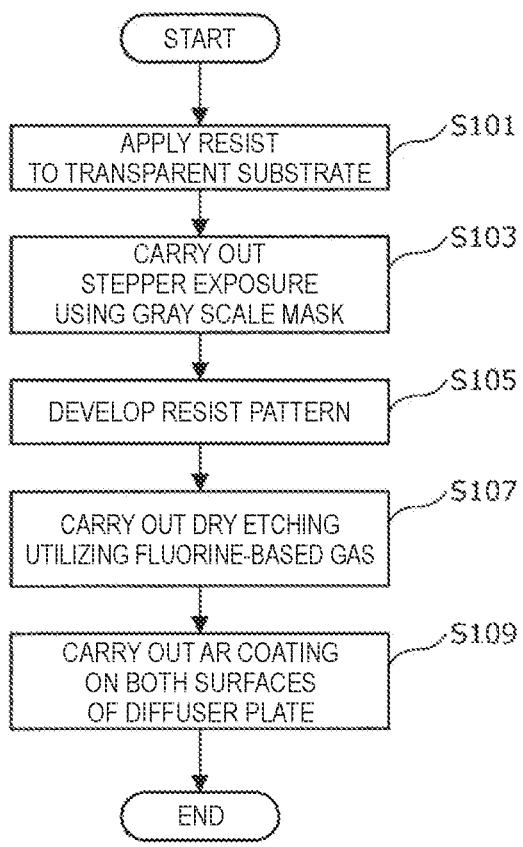
FIG. 8 is a flowchart illustrating an example of a flow of a manufacturing method of the diffuser plate according to the embodiment.
Figure 9:
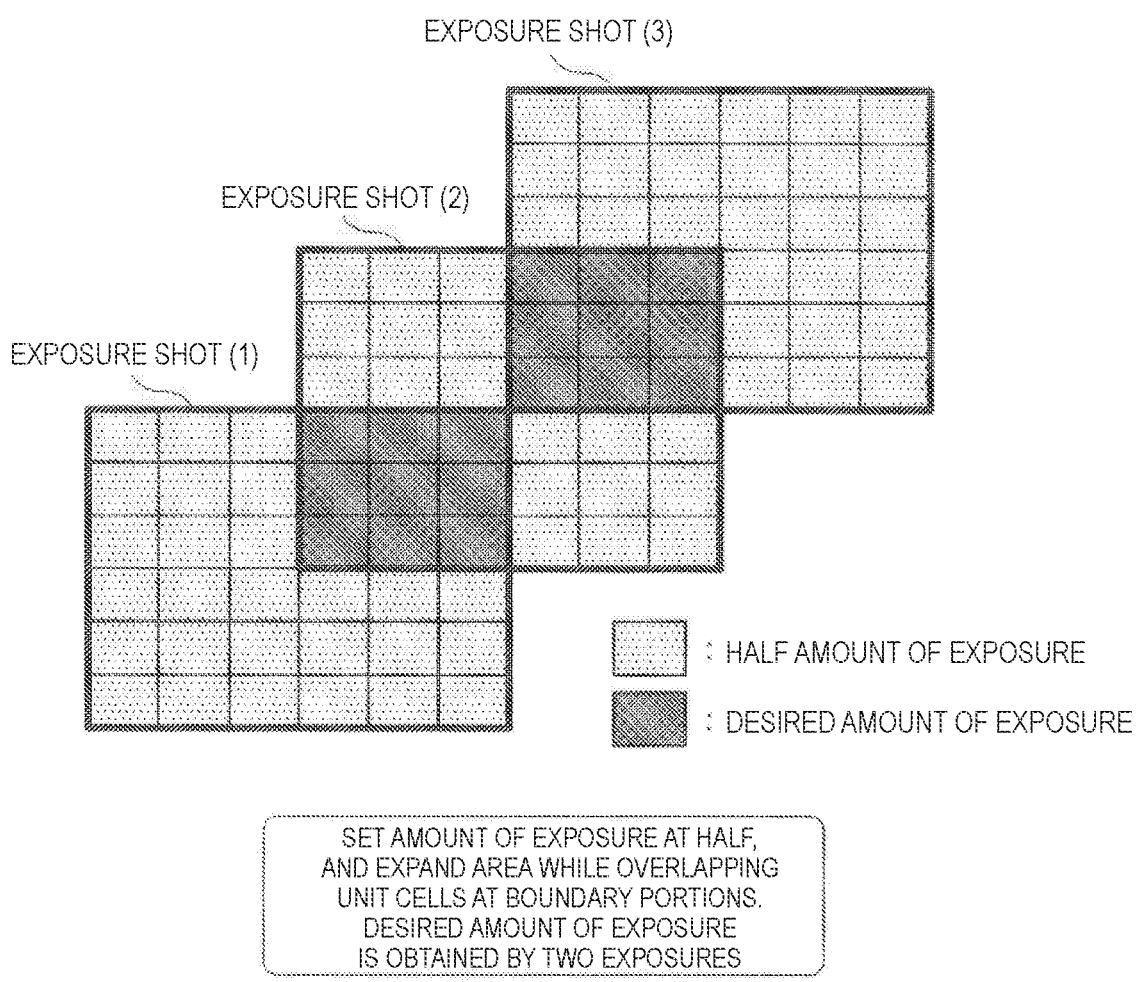
FIG. 9 is an explanatory diagram for describing the manufacturing method of the diffuser plate according to the embodiment.
Figure 10:
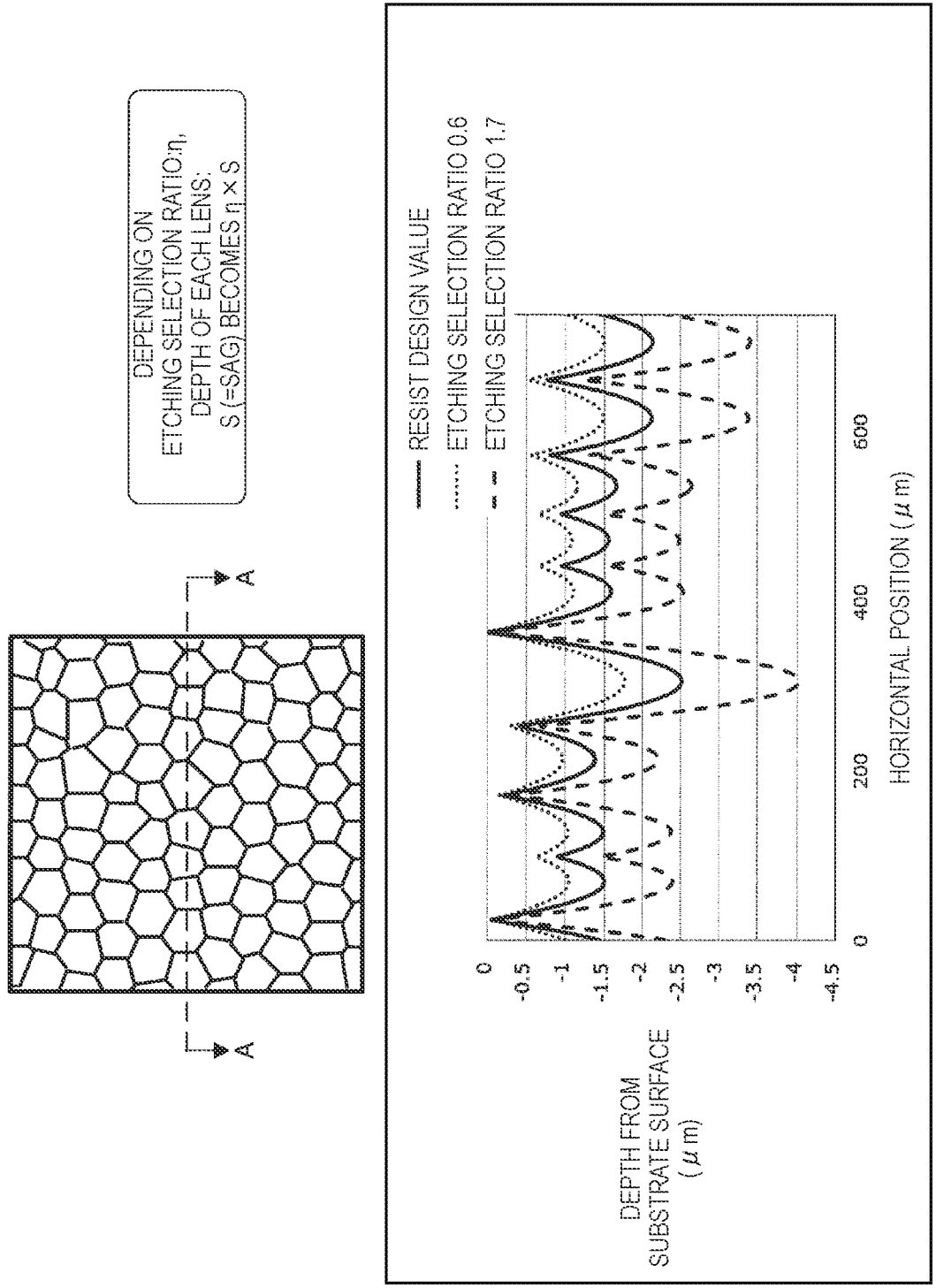
FIG. 10 is an explanatory diagram for describing the manufacturing method of the diffuser plate according to the embodiment.

Hereinbelow, an example of a manufacturing method of the diffuser plate 1 according to the present embodiment will be described briefly with reference to FIG. 8 to FIG. 10. FIG. 8 is a flowchart illustrating an example of a flow of the manufacturing method of the diffuser plate according to the embodiment. FIG. 9 and FIG. 10 are explanatory diagrams for describing the manufacturing method of the diffuser plate according to the present embodiment.

It is possible to manufacture the diffuser plate 1 according to the present embodiment by transferring a pattern made of an organic material, such as photoresist, for example, to a substrate by dry etching, as will be described below.

In such a manufacturing method, applying resist onto the predetermined transparent substrate 10 is carried out first (step S101). Here, in the manufacturing method as described below, since a fluorine-based etching gas such as $CF_4$, $SF_6$, or $CHF_3$ is generally used as an etching gas, it is preferable to use, for the transparent substrate 10, quartz glass or Tempax glass that does not contain $Al_2O_3$, an alkaline component such as alkali metal (or an alkaline component content of less than or equal to 20 mass %, more preferably less than or equal to 10 mass %) or the like that react with a fluorine-based etching gas as described above to turn into nonvolatile materials. For example, when performing dry etching on a glass substrate (for example, EAGLE XG (the name of a product made by Corning Incorporated) or the like) that contains 27% $Al_2O_3$ and does not contain alkali metal at all, by using a fluorine-based etching gas as described above, a problem will occur in that unetched microprojections of $Al_2O_3$ occur at the surface, resulting in reduced transmittance.

Subsequently, by using a gray scale mask, a stepper exposure is carried out on the transparent substrate 10 on which the resist has been applied (step S103).

On this occasion, as schematically illustrated in FIG. 9, it is also possible to use an array of the unit cells 3 each of which are smaller than or equal to approximately 1 mm and which are further repeated vertically and horizontally, as a basic cell of approximately 1 to 20 mm, and to use such a basic cell as a repetition unit in a step and repeat exposure.

In this case, pattern joints having a width of at most approximately several micrometers occur between basic cells depending on the positional accuracy in stepping, whilst it is possible to prevent these pattern joints from occurring by moving an exposure shot at the unit cell interval and performing an exposure with patterns overlapping, as schematically illustrated in FIG. 9. On this occasion, in the case where the amount of exposure by one exposure is set at a half of a desired amount of exposure, it is possible to achieve the desired amount of exposure by four exposures. In addition, it is also possible to eliminate joints by performing a step and repeat exposure in such a manner that edges of adjacent basic cells overlap slightly (with a width of less than or equal to 500 nm, for example). In this case, a plurality of exposures become unnecessary.

Subsequently, the resist pattern on which the stepper exposure has been terminated is developed (step S105). Accordingly, a desired microlens pattern is formed on the resist applied onto the transparent substrate 10.

Subsequently, dry etching is carried out on the transparent substrate 10 on which development has been terminated, by utilizing a fluorine-based etching gas as described above (step S107). Accordingly, the microlens pattern formed on the resist is transferred to the transparent substrate 10.

Thereafter, by using a dielectric as described above, AR coating is performed through vapor deposition or sputtering on the front surface and the rear surface of the transparent substrate 10 on which the microlens pattern has been formed to form the antireflection layer 30 (step S109). In addition, by using a manufacturing method of a publicly-known moth-eye structure, an antireflection structure composed of concavities and convexities having sizes smaller than or equal to the wavelength of light may be formed as the antireflection layer 30 on the surface of the microlenses.

In this manner, the diffuser plate 1 according to the present embodiment is produced by forming a resist pattern having a lens curved surface on the transparent substrate 10 such as a glass substrate by a gray scale exposure, and then performing dry etching on such a resist pattern to transfer the lens shape onto the transparent substrate 10. Here, a lens-like resist pattern shape to be transferred to the transparent substrate 10 is determined taking not only conditions of the gray scale exposure but also conditions of the dry etching into consideration.

Here, the ratio between the etching speed for the resist in dry etching and the etching speed for the transparent substrate 10 (such as glass, for example) in the dry etching (=the etching speed for the transparent substrate/the etching speed for the resist) will be referred to as an "etching selection ratio". On this occasion, by regulating the flow rate of each etching gas in the dry etching step, it is possible to change the above-described etching selection ratio. Accordingly, it is possible to perform fine adjustment of the lens shape (for example, the radius of curvature of the microlenses 21) to be transferred.

Specifically, in the case of using $CF_4$, Ar, or $O_2$ as an etching gas, the etching selection ratio as described above changes to 1.0 to 1.7 when the flow rate (="flow of $CF_4$ gas/flow of Ar gas") is changed within the range of 0.25 to 4. Further, when 3% to 10% $O_2$ gas is added in this state, the etching selection ratio as described above can be reduced to 0.7 to 1.0. In this manner, it is possible to change the etching selection ratio to 0.7 to 1.7 depending on conditions of the etching gas.

Such a phenomenon means that the radius of curvature of microlenses made of photoresist obtained by the gray scale exposure can be adjusted by etching within the range of 70 to 170%.

The shape of the resist pattern formed by the gray scale exposure is determined while taking into consideration the lens pattern of the transparent substrate 10 which is a final completed body of the diffuser plate and a shape deformation through the above-described etching. Specifically, when expressing the etching selection ratio as η and the depth (which is also a sag amount) of the respective microlenses 21 as S, the depth of the microlenses 21 actually formed on the transparent substrate 10 becomes approximately η×S. In addition, when assuming the radius of curvature of the resist pattern as R, the radius of curvature after etching becomes R/η.

FIG. 10 illustrates results obtained by actually measuring the shape of the resist patterns formed in the case where the etching selection ratio is set at 0.6 and 1.7. In such measurement, the shape of the almost central portion (the shape in the vicinity of an A-A cut line at the top of FIG. 10) of a microlens array is actually measured with a laser confocal microscope. As is apparent from FIG. 10, a resist design value and the shape of a transferred completed body do not always match with each other.

Figure 11:
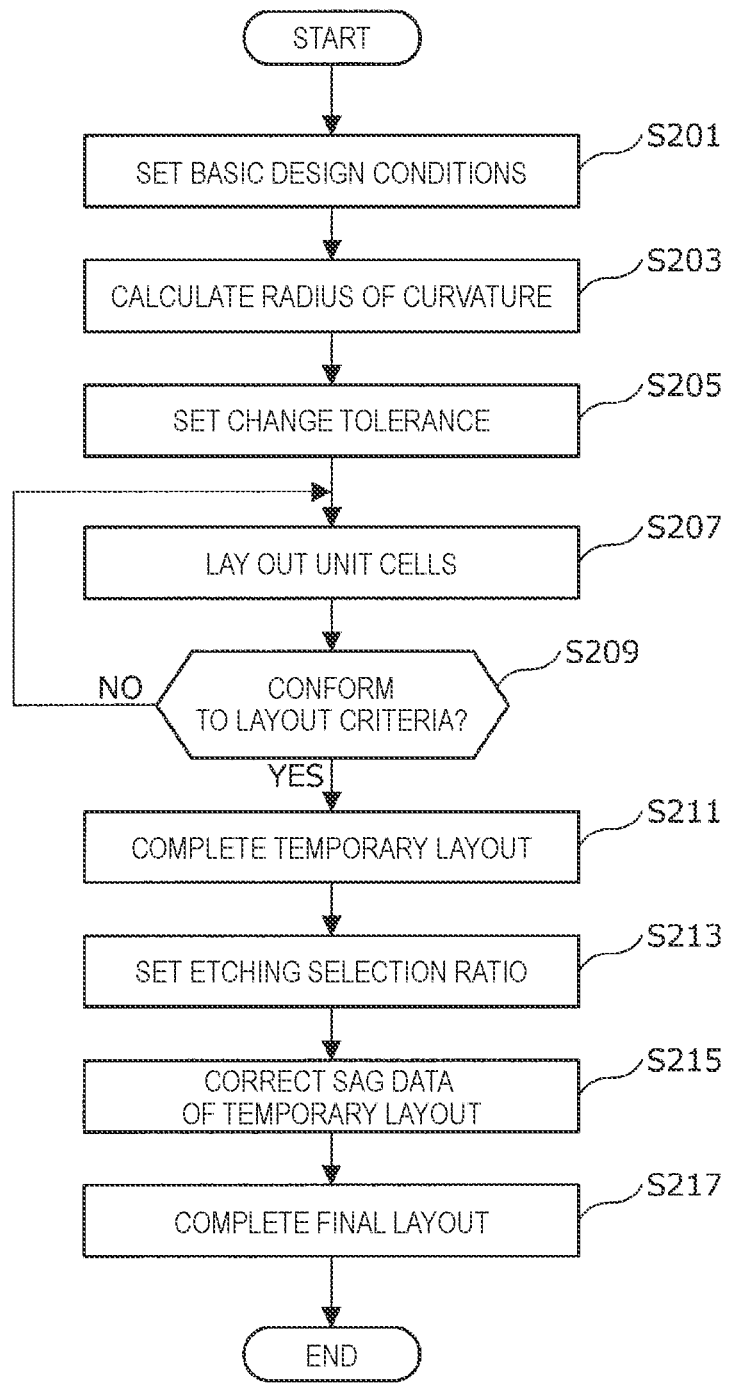
FIG. 11 is a flowchart illustrating an example of a flow of a designing method of the diffuser plate according to the embodiment.

Therefore, a designing method as illustrated in FIG. 11 is employed when manufacturing the diffuser plate according to the present embodiment.

(Designing Method of Diffuser Plate)

Hereinbelow, an example of a designing method of the diffuser plate 1 according to the present embodiment will be described briefly with reference to FIG. 11. FIG. 11 is a flowchart illustrating an example of a flow of the designing method of the diffuser plate according to the present embodiment.

In the designing method of the diffuser plate according to the present embodiment, first, basic design conditions such as a refractive index n of the transparent substrate 10, a diffusion angle size θ to be achieved, and the pitch p of the microlenses 21 are set (step S201). Thereafter, a radius of curvature R (n, θ, p) is calculated on the basis of Expression 103 below (step S203).

[Math. 3]

$$R(n, \theta, p) = \frac{p \cdot (n-1)}{2 \sin \frac{\theta}{2}} \quad \text{(Expression 103)}$$

Subsequently, in the designing method of the diffuser plate according to the present embodiment, change tolerances such as a radius-of-curvature changing range ΔR, a pitch changing range Δp, and a lens-vertex-height changing range Δh are set (step S205). Then, layout of unit cells is carried out by utilizing a publicly-known lens location calculation algorithm (step S207).

When layout of unit cells is terminated, it is determined whether or not the laid-out unit cells conform to layout criteria (step S209). Such layout criteria are the conditions (1) to (3) as described earlier.

In the case where the laid-out unit cells fail to satisfy all of the conditions (1) to (3) described above, the process returns to step S207, and layout of the unit cells is carried out again while changing the basic setting conditions within the range of change tolerances. On the other hand, in the case where the laid-out unit cells satisfy all of the conditions (1) to (3) described above, a temporary layout of unit cells is completed (step S211).

Subsequently, in the designing method of the diffuser plate according to the present embodiment, the above-described etching selection ratio set (step S211). Thereafter, on the basis of the set etching selection ratio η, sag data (that is, height S) of the temporary layout is corrected to a value expressed by η×S (step S215). Accordingly, a final layout of unit cells is completed (step S213).

The example of the designing method of the diffuser plate 1 according to the present embodiment has been described above briefly with reference to FIG. 11.

By using the manufacturing method as described above, it is possible to manufacture the diffuser plate 1 according to the present embodiment with better productivity by utilizing an easier manufacturing process (a dry etching process).

(Specific Example of Manufacturing Method of Diffuser Plate)

A specific example of the above-described manufacturing method of the diffuser plate according to the present embodiment will be described below briefly. Note that the specific example which will be indicated below is merely one specific example of the manufacturing method of the diffuser plate according to the present invention, and the manufacturing method of the diffuser plate according to the present invention is not limited to the following specific example.

First, a Tempax glass substrate, for example, is utilized as the transparent substrate 10, and a positive resist is applied onto this glass substrate. On this occasion, the film thickness of the resist is set at 11 μm so as to be larger than a sag depth of the microlenses 21 to be produced.

Next, by using a gray scale mask and an exposure device (stepper), a step and repeat exposure is carried out. On this occasion, a layout of the gray scale mask used shall be composed of a vertical and horizontal array sequence (that is, a basic cell) of the unit cells 3 having a rectangular shape of 737.6 μm wide×709.6 μm depth. The unit cells 3 are designed such that, for example, the horizontal row of microlenses has an average pitch of 82 μm, and 9 (within a cell, a total of 100 or more) lenses are aligned so as not to be a discontinuous pattern in vertical and horizontal repetition.

Here, the locating condition of the respective microlenses within the unit cell 3 shall be such that the vertex in-plane position falls within a 42-μm in radius from the vertex of a hexagon, the changing range of the height position is smaller than or equal to 2 μm, and the boundaries between adjacent lenses are nonparallel to each other and also nonparallel to the substrate. For the radius of curvature, when assuming that the diffusion angle θ=3 degrees, R=752 μm is obtained after etching according to Expression 103 above. On this occasion, a change caused by the etching selection ratio of 0.90 is taken into account, a curvature of the resist pattern can be R'=752×0.90=677 μm, and the changing range can be 67 μm.

The location that satisfies the above-described conditions that is searched for and determined by using the publicly-known lens location calculation algorithm shall be applied to the unit cells 3.

Further, an array sequence of sixteen unit cells 3 as described above in the horizontal direction×seventeen unit cells 3 in the vertical direction is set as the basic cell, and a step and repeat exposure is performed by using such a basic cell as an exposure unit.

Next, the resist shape obtained after development is used as a mask, and dry etching is performed using a mixed gas of $CF_4$ and Ar as an etching gas. The etching speed is 0.5 μm/min for glass and 0.45 μm/min for resist as an example, and by performing etching deeper than the sag of the resist pattern, the microlens shape of the resist is transferred to the glass substrate.

After lens formation through etching, the antireflection layer 30 made of an $Nb_2O_5/SiO_2$ multilayered film, for example, is formed on the both surfaces of the glass substrate through vapor deposition or sputtering.

By carrying out such a manufacturing method, it is possible to actually manufacture the diffuser plate according to the present embodiment.

(Application Examples of Diffuser Plate)

Next, application examples of the diffuser plate 1 according to the present embodiment will be described briefly.

The diffuser plate 1 according to the present embodiment described above is provided as appropriate in a device that needs to diffuse the light to achieve its function. The device that needs to diffuse the light to achieve its function is a display device such as various types of displays, a projection device such as a projector, and the like, for example.

In addition, the diffuser plate 1 according to the present embodiment is also applicable to a backlight of a liquid crystal display device, and can also be used for optical shaping application. Further, the diffuser plate 1 according to the present embodiment can also be applied to various lighting devices.

Also, the device that needs to diffuse the light to achieve its function is not limited to the above examples, and the diffuser plate 1 according to the present embodiment can be applied to other publicly known devices, as long as it is a device that utilizes diffusion of light.

Second Embodiment

As a diffuser plate used for light having large coherence, such as laser light, diffuser plates having various diffusion full angles, such as a diffusion full angle of approximately 1 degree to 30 degrees, are used. For example, in an application of uniformly spreading incoming laser light on a phosphor surface, a diffuser plate having a diffusion full angle of less than 10 degrees is used, and in an application of obtaining a diffusion property similar to that of a phosphor film utilizing blue light and in an application of reducing speckles, a diffuser plate having a diffusion full angle of approximately 10 degrees to 30 degrees is used. In the case of achieving a diffuser plate having a relatively large diffusion full angle such as the diffusion full angle of 10 degrees to 30 degrees by using a microlens diffuser plate, there is a problem in that attenuation of diffused light is not abrupt in an angular region in which the diffused light intensity attenuates.

Consequently, in the case of achieving a diffuser plate that is also applicable to applications as described above by using a microlens diffuser plate, it is important to achieve a more excellent diffusion property such that attenuation of diffused light becomes abrupt also in an angular region in which the diffused light intensity attenuates, in addition to suppression of diffraction components as described in the first embodiment.

Therefore, in a diffuser plate according to the second embodiment which will be described below in detail, additional conditions are added besides the above-described conditions (1) to (3) concerning each of the microlenses that constitute a unit cell to which attention has been paid in the diffuser plate according to the first embodiment, and thereby a more excellent diffusion property such that attenuation of diffused light becomes abrupt also in an angular region in which the diffused light intensity attenuates is achieved, in addition to suppression of diffraction components.

(Diffuser Plate)

The diffuser plate 1 according to the second embodiment of the present invention is a microlens array diffuser plate in which a microlens group composed of a plurality of microlenses is located on a substrate, similarly to the diffuser plate 1 according to the first embodiment. Such a diffuser plate 1 includes a plurality of unit cells 3 in the same manner as the diffuser plate 1 according to the first embodiment illustrated in FIG. 1. In addition, between the unit cells 3, a layout pattern (location pattern) of a plurality of microlenses provided in the unit cells 3 is continuous in the sequence direction (in other words, the array sequence direction) of the unit cells.

Hereinbelow, differences from the diffuser plate 1 according to the first embodiment will be mainly described with reference to FIG. 12 to FIG. 16, and detailed description of components similar to those of the diffuser plate 1 according to the first embodiment will be omitted.

Figure 12:
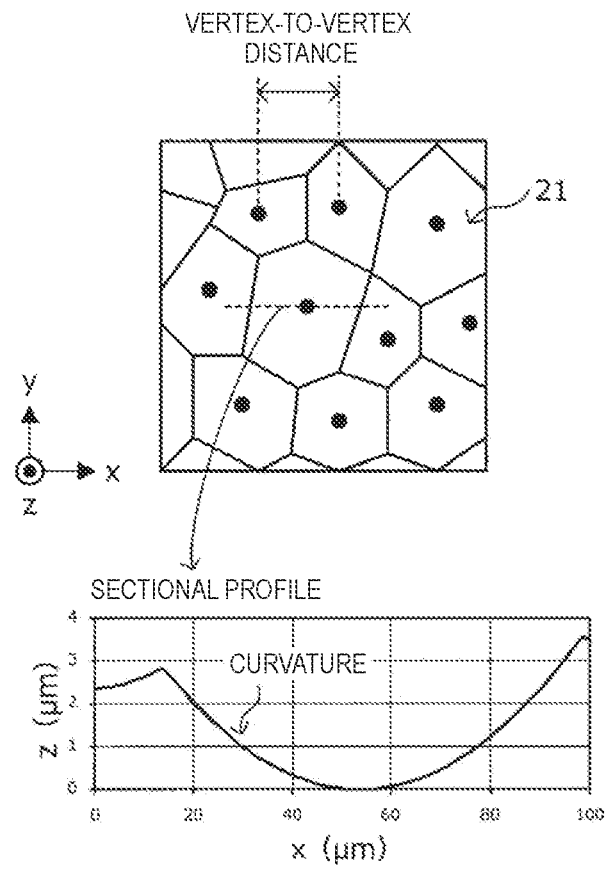
FIG. 12 is an explanatory diagram schematically illustrating part of unit cells that constitute a diffuser plate according to a second embodiment of the present invention.
Figure 13A:
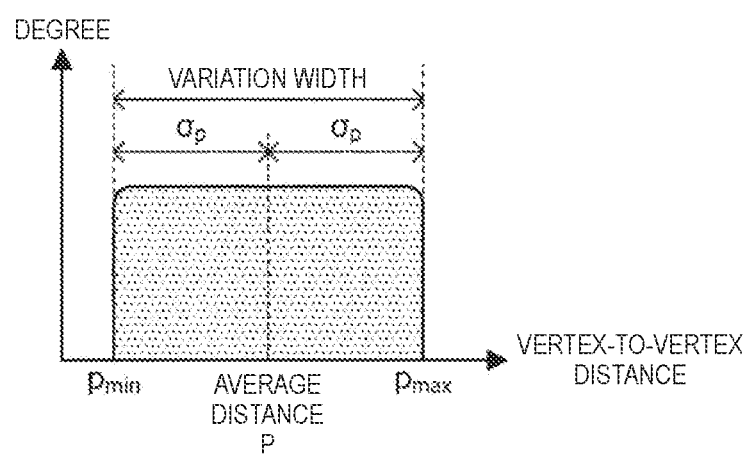
FIG. 13A is an explanatory diagram for describing variations in vertex-to-vertex distance in a microlens group according to the embodiment.
Figure 13B:
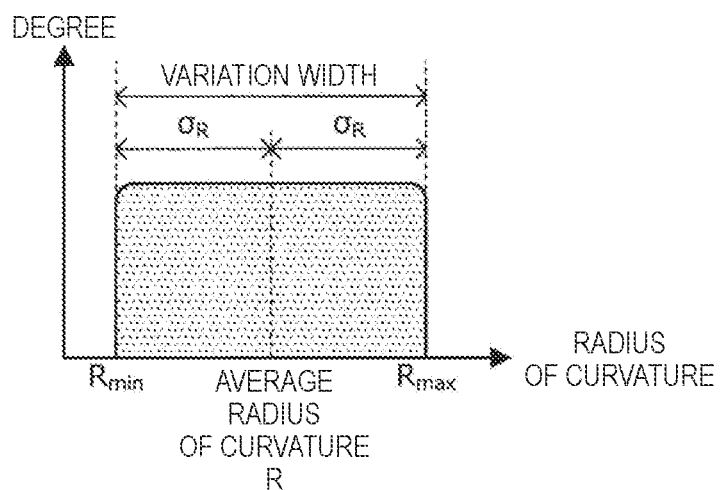
FIG. 13B is an explanatory diagram for describing variations in radius of curvature in the microlens group according to the embodiment.
Figure 14:
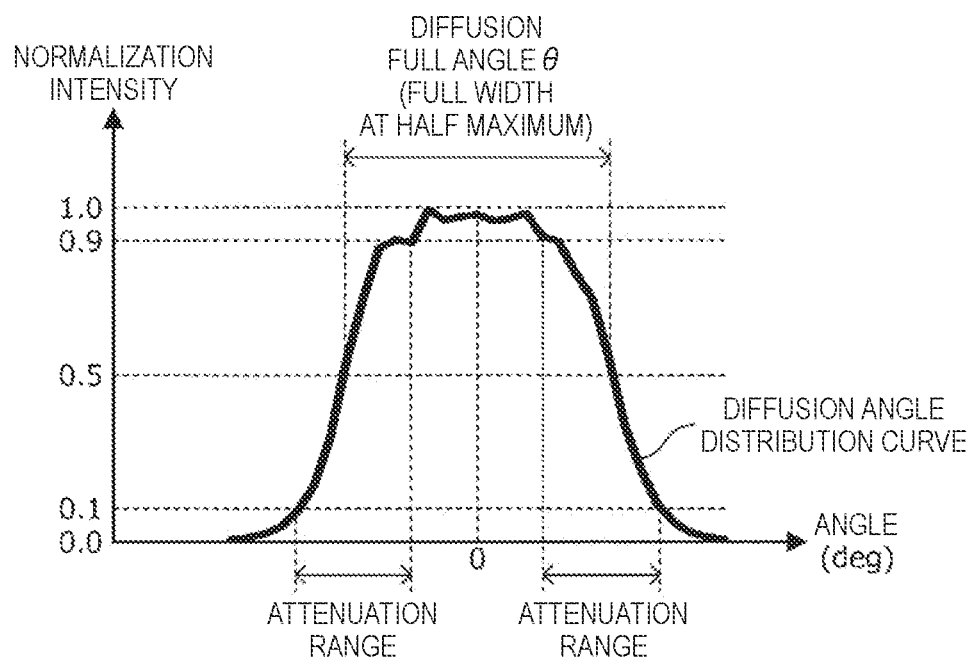
FIG. 14 is an explanatory diagram for describing an attenuation range in the diffuser plate according to the embodiment.
Figure 15A:
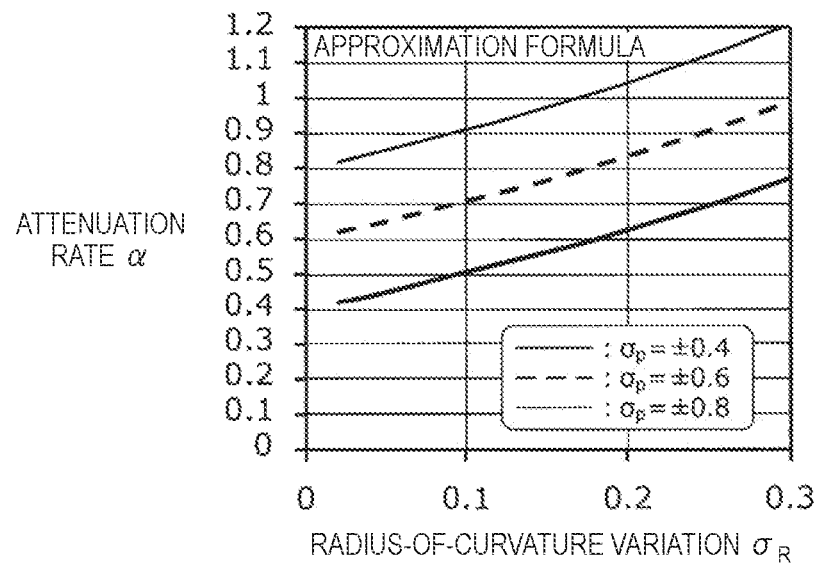
FIG. 15A is a graph illustrating the relationship between attenuation rates and variations in vertex-to-vertex distance and radius of curvature.
Figure 15B:
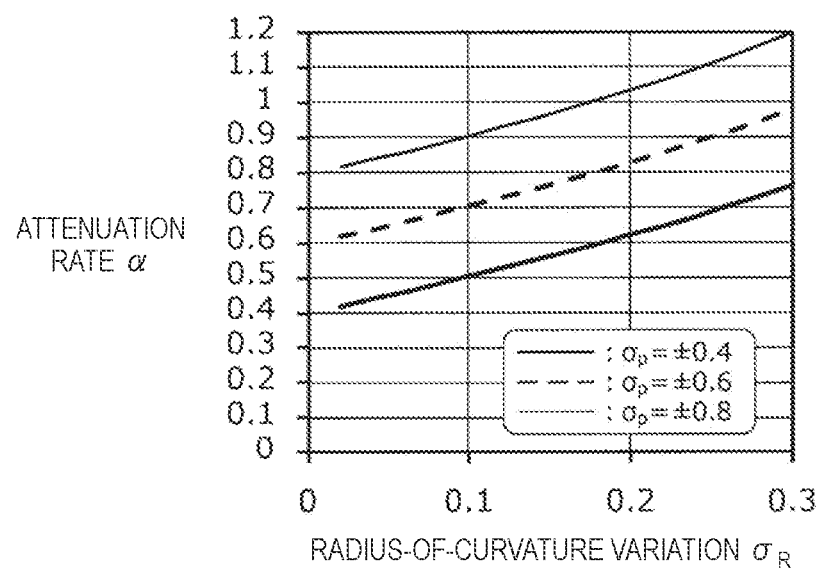
FIG. 15B is a graph illustrating the relationship between attenuation rates and variations in vertex-to-vertex distance and radius of curvature.
Figure 16:
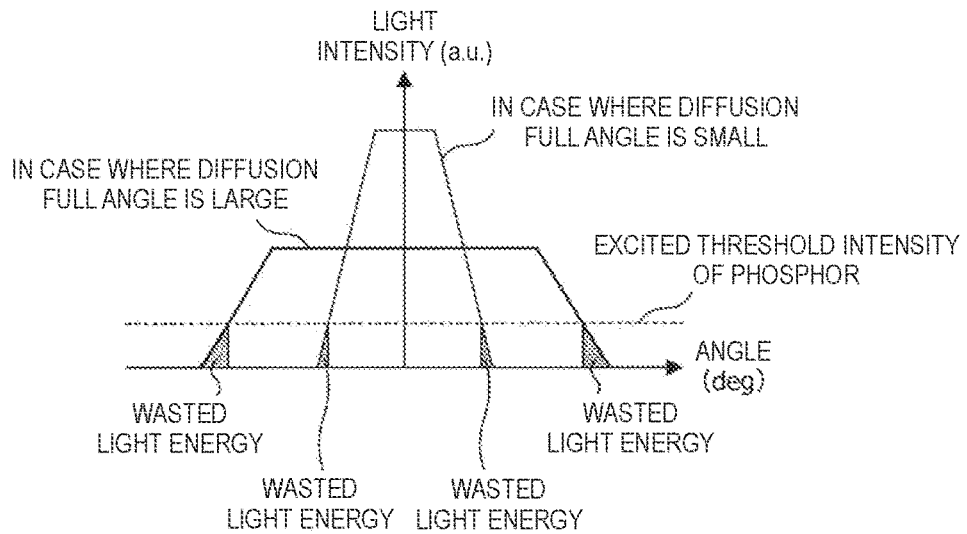
FIG. 16 is an explanatory diagram for describing relationships between diffusion full angles and attenuation rates in the diffuser plate.

FIG. 12 is an explanatory diagram schematically illustrating part of unit cells that constitute the diffuser plate according to the present embodiment. FIG. 13A is an explanatory diagram for describing variations in vertex-to-vertex distance in the microlens group according to the present embodiment, and FIG. 13B is an explanatory diagram for describing variations in radius of curvature in the microlens group according to the present embodiment. FIG. 14 is an explanatory diagram for describing an attenuation width in the diffuser plate according to the present embodiment, and FIG. 15A and FIG. 15B are graphs illustrating the relationship between attenuation rates and variations in vertex-to-vertex distance and radius of curvature. FIG. 16 is an explanatory diagram for describing the relationship between diffusion full angles and attenuation rates in the diffuser plate.

The unit cell 3 included in the diffuser plate 1 according to the present embodiment has the transparent substrate 10 and the microlens group 20 formed on a surface of the transparent substrate 10, similarly to the unit cell 3 according to the first embodiment illustrated in FIG. 2.

<Transparent Substrate 10>

Here, since the transparent substrate 10 of the unit cells 3 according to the present embodiment has a similar structure to the transparent substrate 10 of the unit cells 3 according to the first embodiment and exerts similar effects, detailed description will be omitted below.

<Microlens Group 20>

The microlens group 20 composed of the plurality of microlenses 21 is formed on the surface of the transparent substrate 10, similarly to the first embodiment. Since an essential usage of the diffuser plate is to diffuse light, it is preferable that, for the microlenses 21 that constitute the unit cells 3, the light outgoing surface is entirely composed of concave lenses. In addition, also in the microlens group 20 according to the present embodiment, the respective microlenses 21 are not identical in radius of curvature and vertex-to-vertex pitch, and the respective microlenses 21 have variations in a certain range, so that the focal length also has a certain distribution. In the case of concave lenses, the focal point is an imaginary point, whilst the light intensity density increases at the focal point, so that it is preferable that the focal point of each of the microlenses 21 is present in a region adjacent to the transparent substrate 10 that constitutes the diffuser plate 1.

In addition, in the microlens group 20 according to the present embodiment, the respective microlenses 21 that constitute the unit cells 3 are arranged so as to satisfy three conditions (1) to (3) indicated below, similarly to the first embodiment.

(1) The boundaries on the four sides of the unit cell 3 should be such that discontinuousness shall not occur in the pattern in the array sequence.
(2) The planar position and height position of vertices of the respective microlenses 21 (in other words, the lowest position of the depth of concave lenses) and the ridge lines between the microlenses 21 shall be made irregular such that diffraction is sufficiently suppressed.
(3) A non-lens region shall not exist between the adjacent microlenses 21 in order to suppress undiffused transmitted light.

Also in the microlens group 20 according to the present embodiment located to satisfy the above-described three conditions, the ridge lines between the microlenses 21 adjacent to each other are entirely nonparallel to each other, and are nonparallel to the transparent substrate 10.

Hereinbelow, an average value (average pitch) of the pitches of the repetition structures of the microlenses 21 (that is, the vertex-to-vertex distances between the microlenses 21 adjacent to each other in FIG. 12) shall be expressed as p, and an average value of the radii of curvature (average radius of curvature) of curves representing the shapes of the microlens 21 (that is, a curve corresponding to the sectional profile in FIG. 12) shall be expressed as R. In this case, the diffusion full angle (full width at half maximum) θ of the microlens diffuser plate can be expressed as in Expression 201 below using the refractive index n of the microlenses 21, the average pitch (average vertex-to-vertex distance) p, and the average radius of curvature R. On this occasion, the average vertex-to-vertex distance p and the average radius of curvature R are determined on the basis of Expression 201 below such that the desired diffusion full angle θ is obtained.

[Math. 4]

$$\theta = 2\sin^{-1}\left[\frac{p \cdot (n-1)}{2R}\right] \quad \text{(Expression 201)}$$

In the case where the microlens group 20 has a uniform and regular sequence, rays of diffused light from all the microlenses 21 that constitute the array match with each other, and a diffusion property having an abrupt attenuation property in which the central part is flat is obtained. However, since many rays of diffracted light occur because of the cyclical nature of the array structure, this is not preferable as a diffuser plate. Consequently, similarly to the first embodiment, suppression of diffraction components is performed by introducing appropriate irregularity into the lens shapes and lens location. As a result, variations occur in values of vertex-to-vertex distance and radius of curvature as schematically illustrated in FIG. 13A and FIG. 13B.

Now, as illustrated in FIG. 13A, in the case of expressing the maximum value of the vertex-to-vertex distance occurring as a result of introducing irregularity as $p_{max}$, and expressing the minimum value of the vertex-to-vertex distance as $p_{min}$, $\sigma_p$ obtained by Expression 203 below is utilized as a variation degree of the vertex-to-vertex distances from the average value in the present embodiment.

Similarly, as illustrated in FIG. 13B, in the case of expressing the maximum value of the radius of curvature occurring as a result of introducing irregularity as $R_{max}$, and expressing the minimum value of the radius of curvature as $R_{min}$, $\sigma_R$ obtained by Expression 205 below is utilized as a variation degree of the radii of curvature from the average value in the present embodiment.

[Math. 5]

$$\sigma_p = \frac{p - p_{min}}{p} = \frac{p_{max} - p}{p} \quad \text{(Expression 203)}$$

$$\sigma_R = \frac{R - R_{min}}{R} = \frac{R_{max} - R}{R} \quad \text{(Expression 205)}$$

In the present embodiment, abruptness in the diffusion property (in particular, attenuation property) shall be expressed by an attenuation rate α expressed by Expression 207 below. Here, θ in Expression 207 below is the diffusion full angle, and corresponds to the full width at half maximum of the diffusion angle distribution curve as schematically illustrated in FIG. 14. In addition, as schematically illustrated in FIG. 14, on the diffusion angle distribution curve, an angular region from an angle at which the intensity becomes 90% of the maximum value to an angle at which the intensity becomes 10% of the maximum value shall be referred to as an attenuation range, and an average value of the extent (that is, an angular width) of such an attenuation range in the circumferential direction is expressed as an attenuation width δ in Expression 207 below. For example, in the example illustrated in FIG. 14, two attenuation ranges exist. The two attenuation ranges include a region where angles have positive values and a region where angles have negative values. The attenuation width δ used in Expression 207 below is an average value of the extents of these two attenuation ranges (angular widths).

In addition, concerning irregularity of the location of the microlenses to be introduced, a changing range dp of the vertex-to-vertex distance and a changing range dR of the radius of curvature shall be expressed by Expression 209 and Expression 211 below utilizing the variation degrees $\sigma_p$ and $\sigma_R$ given by Expression 203 and Expression 205 above.

[Math. 6]

$$\alpha = \frac{\delta}{\theta} \quad \text{(Expression 207)}$$

$$dp = p \cdot (1 \pm \sigma_p) \quad \text{(Expression 209)}$$

$$dR = R \cdot (1 \pm \sigma_R) \quad \text{(Expression 211)}$$

In this case, the attenuation width δ can be expressed as Expression 213 below using Expression 201, Expression 209, and Expression 211 above. Here, when performing approximation that the value of (p/R) is sufficiently small, Expression 213 below can be expressed as Expression 215. Consequently, the attenuation rate α defined by Expression 207 above can be expressed as Expression 217 below using Expression 215 below.

[Math. 7]

$$\delta = \sin^{-1}\left[\frac{p \cdot (1 + \sigma_p) \cdot (n-1)}{2R \cdot (1 - \sigma_R)}\right] - \sin^{-1}\left[\frac{p \cdot (1 - \sigma_p) \cdot (n-1)}{2R \cdot (1 + \sigma_R)}\right] \quad \text{(Expression 213)}$$

$$\delta \cong \frac{\theta}{2}\left[\frac{(1+\sigma_p)}{(1-\sigma_R)} - \frac{(1-\sigma_p)}{(1+\sigma_R)}\right] \quad \text{(Expression 215)}$$

$$\alpha = \frac{\delta}{\theta} = \frac{1}{2}\left[\frac{(1+\sigma_p)}{(1-\sigma_R)} - \frac{(1-\sigma_p)}{(1+\sigma_R)}\right] \quad \text{(Expression 217)}$$

In the case of changing the variation degree $\sigma_R$ of the radius of curvature from 0.02 (2%) to 0.3 (30%) upon fixing the variation degree $\sigma_p$ of the vertex-to-vertex distance at 0.4 (40%), 0.6 (60%), and 0.8 (80%), respectively, how the attenuation rate α given by Expression 217 above changes is calculated, and an obtained result is illustrated in FIG. 15A. In addition, regarding the case of assuming a diffuser plate in which the average vertex-to-vertex distance p=90 μm, the average radius of curvature R=300 μm, and the refractive index n=1.47 (that is, the diffusion full angle θ 8 degrees), and changing the variation degree $\sigma_p$ of the vertex-to-vertex distance from 0.4 (40%) to 0.8 (80%) while changing the variation degree $\sigma_R$ of the radius of curvature from 0.02 (2%) to 0.3 (30%), the diffusion angle distribution curve is calculated using a commercially-available ray tracking simulator. A result of calculating the attenuation rate α from the obtained diffusion angle distribution curve thereafter is illustrated in FIG. 15B. As is apparent from comparison between FIG. 15A and FIG. 15B, the calculation result of the attenuation rate α through use of the approximation formula as shown in Expression 217 above substantially agrees with the result of ray tracking simulation, and it can be said that the approximation formula shown in Expression 217 above is appropriate.

It is possible to suitably utilize the diffuser plate 1 according to the present embodiment for an application such as uniformly spreading light having large coherence, such as laser light, for example, to a phosphor surface. In such an application, the attenuation rate α as described above influences the light conversion efficiency in phosphor, and is thus required to be usually less than or equal to 1, more preferably less than or equal to 0.9.

Here, looking at the result of calculation using Expression 217 above illustrated in FIG. 15A, it is understood that when the variation degree $\sigma_p$ of the vertex-to-vertex distance=0.6 (60%) and the variation degree $\sigma_R$ of the radius of curvature=0.2 (20%), the attenuation rate α=0.83. Such a result suggests that it is possible to make the attenuation rate α of the diffusion property less than or equal to 0.9 when the vertex-to-vertex distances of the microlenses 21 adjacent to each other that constitute the unit cell 3 have variations within a range of ±60% from an average value (in other words, the variation degree $\sigma_p$ of the vertex-to-vertex distance satisfies the relation of $0<\sigma_p \leq 0.6$) and the radii of curvature of the respective microlenses 21 that constitute the unit cell 3 have variations within a range of ±20% from an average value (in other words, the variation degree $\sigma_R$ of the radius of curvature satisfies the relation of $0<\sigma_R \leq 0.2$).

Consequently, in the microlens group 20 according to the present embodiment, it is preferable that conditions (4) and (5) below are further satisfied, and it is more preferable that the conditions (4) to (6) below are further satisfied.

(4) The vertex-to-vertex distances of the microlenses 21 adjacent to each other that constitute the unit cell 3 shall be included within a range of ±60% from an average value.

(5) The radii of curvature of the microlenses 21 shall be included within a range of ±20% from an average value.
(6) When expressing the variation degree of the vertex-to-vertex distances from the average value as $\sigma_p$ and the variation degree of the radii of curvature from the average value as $\sigma_R$, the relation of Expression 217 above shall be achieved.

Here, even if the attenuation rate α is constant, the attenuation range extent δ increases in proportion to the diffusion full angle θ when the diffusion full angle θ increases. The conversion efficiency of phosphor depends on the attenuation range extent δ rather than the attenuation rate α, and as schematically illustrated in FIG. 16, as the attenuation range extent δ becomes wider, wasted light energy also increases. Consequently, in the case of achieving a diffuser plate having a larger diffusion full angle θ, the required attenuation rate α becomes smaller. Thus, a result of improvement in conversion efficiency obtained by the diffuser plate 1 according to the present embodiment becomes larger in the case where the diffusion full angle θ=larger than or equal to 10 degrees (in other words, f-number=smaller than or equal to 5.5).

Note that the average vertex-to-vertex distance and the average radius of curvature of the microlenses 21 are determined by Expression 201 above in accordance with the required diffusion full angle θ (for example, θ=1 to 30 degrees) as mentioned earlier. In the case where the ratios between the average vertex-to-vertex distance and the average radius of curvature are the same, the diffusion full angles θ become a same value, whilst the average vertex-to-vertex distance is restricted by the incoming light diameter, the sag in production, or the like, and the average radius of curvature is restricted by a resolution in the depth direction determined by a production method, or the like, in addition to the sag in production. Thus, considering these practical restrictions, it is preferable that the average vertex-to-vertex distance p falls within the range of 13 to 90 μm, and it is preferable that the average radius of curvature R falls within the range of 20 to 2000 μm.

As described above, with regard to the new perspective of optimization of the attenuation property, the diffuser plate 1 according to the present embodiment is paying attention to the fact that the attenuation property is related to two parameters including the distribution of microlens locations and the distribution of radii of curvature, and the ranges of these two parameters are defined. Accordingly, in the diffuser plate according to the present embodiment, it is possible to optimize the attenuation property while achieving reduction of diffraction components.

<Antireflection Layer>

The antireflection layer 30 may be formed on a front surface and a rear surface of the diffuser plate 1 according to the present embodiment (in other words, a surface of the microlenses 21 and a surface of the transparent substrate 10 at a side where the microlens group 20 is not arranged) for the purpose of increasing transmittance and preventing reflection stray light and the like. Since it is possible to provide, as such an antireflection layer 30, a layer similar to the antireflection layer 30 in the diffuser plate 1 according to the first embodiment, detailed description will be omitted below.

The diffuser plate according to the present embodiment has been described above in detail with reference to FIG. 12 to FIG. 16.

(Designing Method of Diffuser Plate)

In the diffuser plate according to the present embodiment, the procedure of locating the microlenses 21 is not particularly limited. For example, upon initially locating vertices of the respective microlenses 21 at positions corresponding to the respective vertices of hexagon, the vertex positions may be displaced within a range that satisfy the conditions (1) to (5) above, more preferably within a range that satisfy the conditions (1) to (6) above. In addition, similarly to the method described in the first embodiment, a positional relationship that satisfies the conditions (1) to (5) above, more preferably a positional relationship that satisfies the conditions (1) to (6) above may be sequentially obtained using various computers without providing initial positions.

Here, when designing the diffuser plate according to the present embodiment, it is important to consider restrictions on the production process. For example, in the case of performing a gray mask exposure, a resist depth that can be exposed is defined by the focal depth ($=\lambda/NA^2$) of the stepper. For example, in the case of using i-line (λ=365 nm), NA of the stepper is 0.4 to 0.6, and the resist depth that can be exposed becomes about 15 μm. Thus, it is preferable that the sag depth is set at less than or equal to 15 μm.

In the case of determining the location of microlenses by the method of providing initial positions, it is possible to easily control statistics (for example, average value, range, or the like) of the vertex-to-vertex distances of the microlenses. On the other hand, in the case of sequentially determining the location of the microlenses without providing initial positions, it is possible to reduce diffraction components more efficiently.

(Manufacturing Method of Diffuser Plate)

It is possible to manufacture the diffuser plate 1 according to the present embodiment similarly to the manufacturing method of the diffuser plate 1 according to the first embodiment.

Note that, in the case of manufacturing a diffuser plate having a large diffusion angle (in other words, having a large f-number), it is possible to obtain the effects according to the present embodiment more significantly. In the case of adjusting the f-number depending on an intended use, the array location according to the present embodiment allows the f-number to be precisely controlled by changing the sag depth even if the planar shapes are the same. That is, by changing the process time by a manufacturing method which will be described later, it is possible to achieve a desired f-number, and in addition, it is also possible to achieve high productivity. For the purpose of significantly expanding incoming light, it is desirable that the f-number is smaller than or equal to 5.5, but even if the f-number is higher than that (for example, even if the f-number is approximately 8 to 60 for the purpose of making the light intensities of a laser array light source uniform, or the like), it is possible to manufacture the diffuser plate by shortening the process time by using a similar pattern.

(Application Examples of Diffuser Plate)

Next, application examples of the diffuser plate 1 according to the present embodiment will be described briefly.

The diffuser plate 1 according to the present embodiment described above is provided as appropriate in a device that needs to diffuse the light to achive its function. The device that needs to diffuse the light to achieve its function is a display device such as various types of displays, a projection device such as a projector, and the like, for example.

In addition, the diffuser plate 1 according to the present embodiment is also applicable to a backlight of a liquid crystal display device, and can also be used for optical shaping application. Further, the diffuser plate 1 according to the present embodiment can also be applied to various lighting devices.

Also, the device that needs to diffuse the light to achieve its function is not limited to the above examples, and the diffuser plate 1 according to the present embodiment can be applied to other publicly known devices, as long as it is a device that utilizes diffusion of light.

Example

Next, the diffuser plate according to the present invention will be described in detail, with Examples and Comparative Examples. Note that the Examples described below are mere examples of the diffuser plate according to the present invention, and the diffuser plate according to the present invention is not limited to the following examples.

Hereinbelow, in order to verify the appropriateness of the diffuser plate according to the first embodiment of the present invention, calculation of an outgoing light intensity distribution in the case of changing the incoming light diameter in a state where the unit cell size and the pitch of the lens array are fixed is performed. In the following verification, the shape of the unit cell 3 is set at 738 μm wide×710 μm depth, and the unit cell size=1024 μm, and such unit cells 3 are located into a 3×3 array to be used as a verification model.

For the verification model as described above, calculation is performed using a commercially-available ray tracking simulator for the cases where four types of circular incoming light whose intensity full width at half maximum are (a) 650 μm, (b) 1000 μm, (c) 1500 μm, and (d) 2000 μm are entered. In the calculation, a spatial filter restricting the spatial resolution of a detector is located so as to bring the spatial resolution closer to actual evaluation conditions. Thus, luminescent spots through diffraction as seen in the results of FIG. 6A to FIG. 6C are averaged to some degree in calculation results indicated below, and the results illustrated in FIG. 6A to FIG. 6C somewhat differ from the results indicated below.

Obtained results are illustrated in FIG. 17A to FIG. 17D.

Figure 17A:
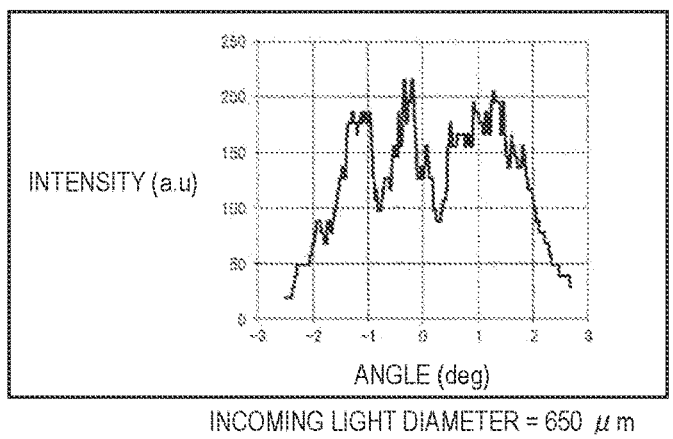
FIG. 17A is a graph illustrating results of examples concerning the diffuser plate according to the first embodiment of the present invention.
Figure 17B:
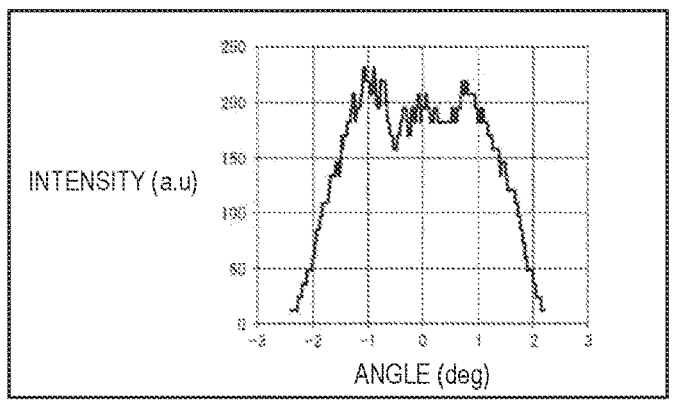
FIG. 17B is a graph illustrating results of examples concerning the diffuser plate according to the first embodiment of the present invention.
Figure 17C:
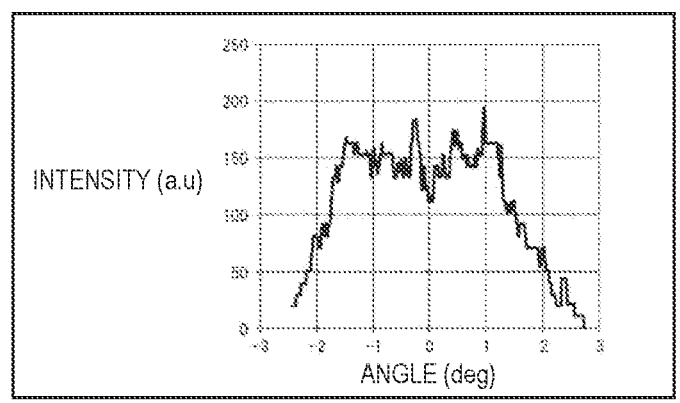
FIG. 17C is a graph illustrating results of examples concerning the diffuser plate according to the first embodiment of the present invention.
Figure 17D:
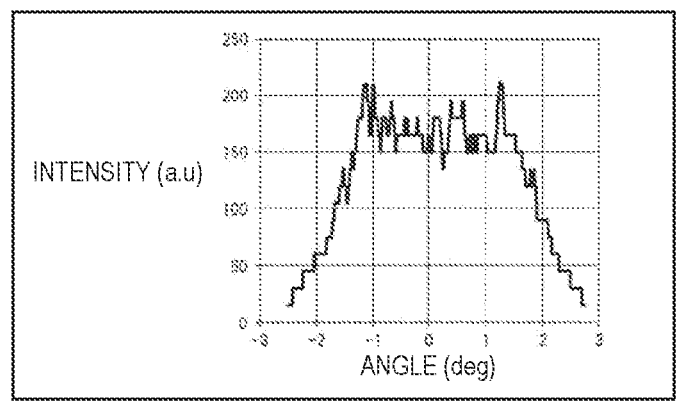
FIG. 17D is a graph illustrating results of examples concerning the diffuser plate according to the first embodiment of the present invention.

As illustrated in FIG. 17A, only in the case where the incoming light diameter is 650 μm, it is understood that sudden intensity changes within a range of a diffusion angle (±1 degree from central angle) that are not recognized in the cases of the other incoming light diameters (FIG. 17B, FIG. 17C, FIG. 17D) occur. This is because, at the incoming light diameter of 650 μm, sub-diffraction through the unit cells 3 does not sufficiently occur because of the presence of most of incoming light components within the unit cell size, and main diffracted light is output without being separated by sub-diffracted light. On the other hand, in FIG. 17A and FIG. 17D, it is understood that sub-diffracted light as described earlier occurs because the unit cell size becomes smaller than or equal to the incoming light diameter, and sudden intensity changes as markedly monitored in FIG. 17A are relaxed.

Such results have revealed that it is possible to provide a diffuser plate in which sub-diffracted light is generated by setting the unit cell size smaller than or equal to the incoming light diameter, and sudden intensity changes do not occur in diffused outgoing light.

Hereinbelow, in order to verify the appropriateness of the diffuser plate according to the second embodiment of the present invention, verification is performed using a commercially-available ray tracking simulator.

A model of a microlens array diffuser plate used for calculation is obtained by locating many concave lenses having constant variations in shapes and locations on a surface of a glass substrate (refractive index n=1.47). In such a simulation, the wavelength $\lambda$=450 nm, and incoming light having an incoming light diameter $\varphi$=0.6 mm is caused to enter into the diffuser plate as described above, and a light diffusion pattern projected on a screen 200 mm ahead is converted into an angular distribution.

Figure 19A:
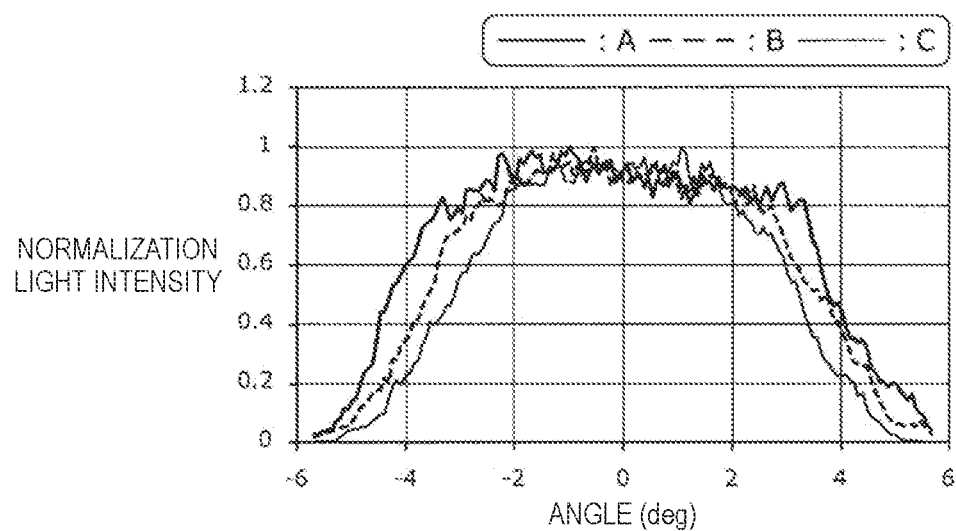
FIG. 19A is a graph illustrating results of examples concerning the diffuser plate according to the second embodiment of the present invention.
Figure 19B:
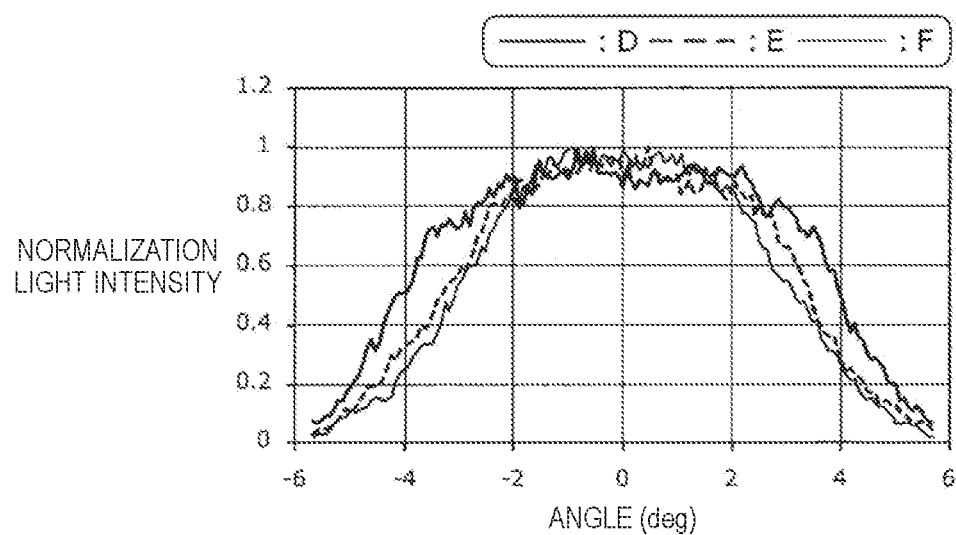
FIG. 19B is a graph illustrating results of examples concerning the diffuser plate according to the second embodiment of the present invention.

FIG. 18 illustrates conditions of diffuser plate models for which simulation is performed as a table, and obtained diffused light distributions are illustrated in FIG. 19A and FIG. 19B. FIG. 19A is a simulation result in the case where the variation degree $\sigma_R$ of the radius of curvature is ±10%, and FIG. 19B is a simulation result in the case where the variation degree $\sigma_R$ of the radius of curvature is ±20%. In addition, the attenuation rates a calculated from the results illustrated in FIG. 19A and FIG. 19B are shown together in the table illustrated in FIG. 18.

As is apparent from the comparison in FIG. 19A and the comparison in FIG. 19B, it is understood that, as the range of variations in vertex-to-vertex distance becomes larger, the attenuation rate $\alpha$ also becomes larger. In addition, from the comparison between the condition A and the condition D, the comparison between the condition B and the condition E, and the comparison between the condition C and the condition F, it is understood that, in the case where the ranges of variations in vertex-to-vertex distance are substantially identical, the attenuation rate $\alpha$ also becomes larger as the range of variations in radius of curvature becomes larger.

Here, it has been revealed that, when the relationship between the amounts of variations and attenuation rates illustrated in FIG. 18 obtained by the ray tracking simulation is plotted in the graph illustrated in FIG. 15A, the relationship substantially agrees with the curve in the graph. Also according to such a result, it is understood that the relationship between the variation degree of the vertex-to-vertex distances, the variation degree of the radii of curvature, and the attenuation rate based on Expression 217 above is appropriate.

Figure 20:
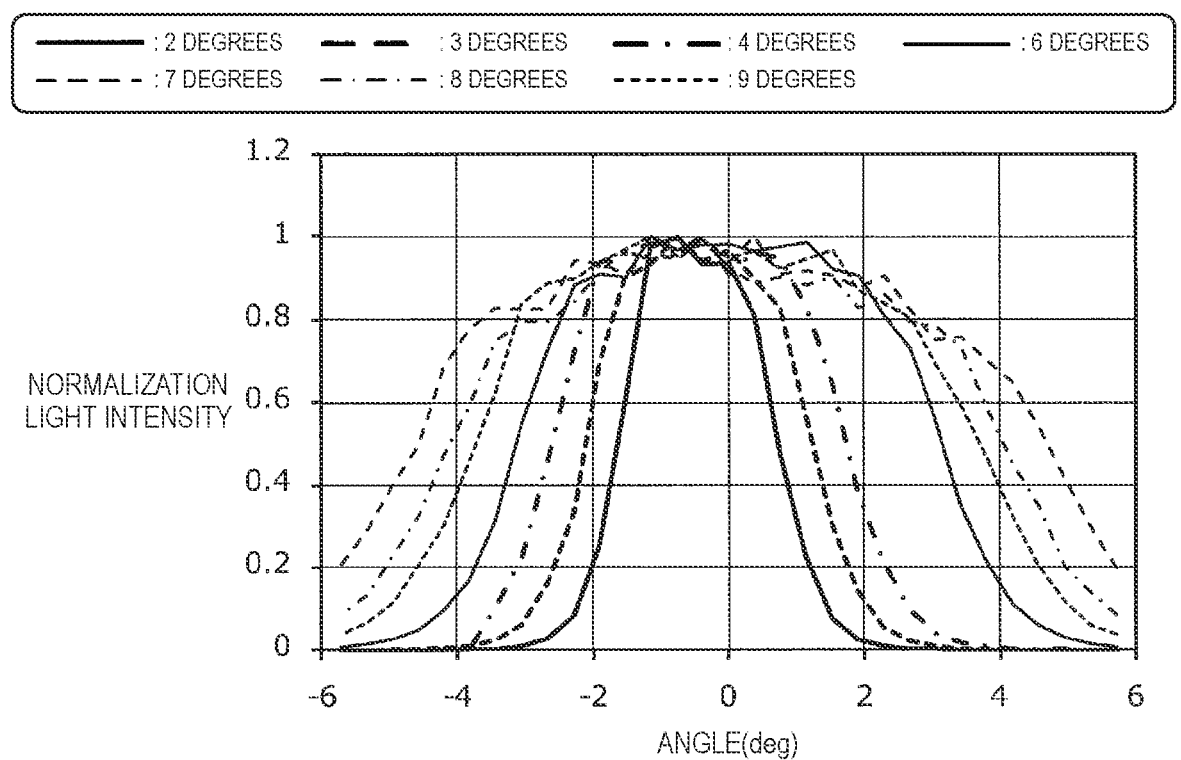
FIG. 20 is a graph illustrating results of examples concerning the diffuser plate according to the second embodiment of the present invention.

In the above-described examples, results in the vicinity of a curvature of 300 μm (generally, a range in which the diffusion angle is 2 degrees to 4 degrees) are described, whilst it is possible to widen the diffusion angle while maintaining the attenuation property constant by adopting design or process conditions in line with the second embodiment of the present invention even in the case of a wider diffusion angle. For example, upon setting the vertex-to-vertex distance at 82 μm±42 μm (variation range: ±50%) and setting the average radius of curvature at 370 μm to 760 μm while setting the variation range of radius of curvature at ±10%, the selection ratio in etching is changed appropriately in the range of 0.8 to 1.4. The diffusion property of a diffuser plate obtained under such design and process conditions is illustrated in FIG. 20. As is apparent from FIG. 20, it is understood that the diffuser plate as described above exhibits a diffusion property whose diffusion angle is 2 degrees to 9 degrees.

Figure 22:
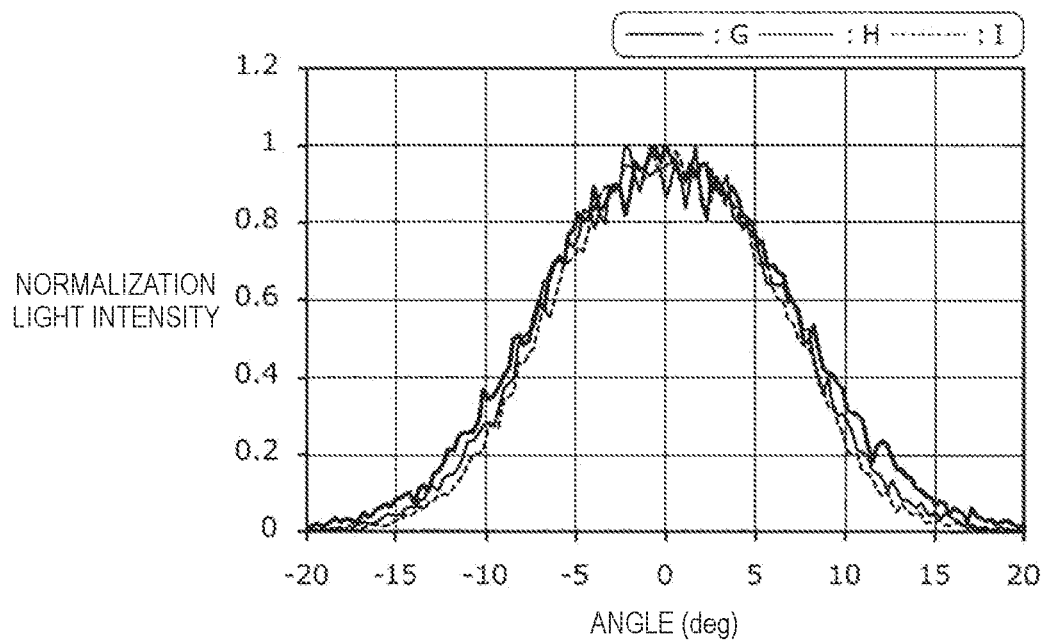
FIG. 22 is a graph illustrating results of examples concerning the diffuser plate according to the second embodiment of the present invention.
Figure 23:
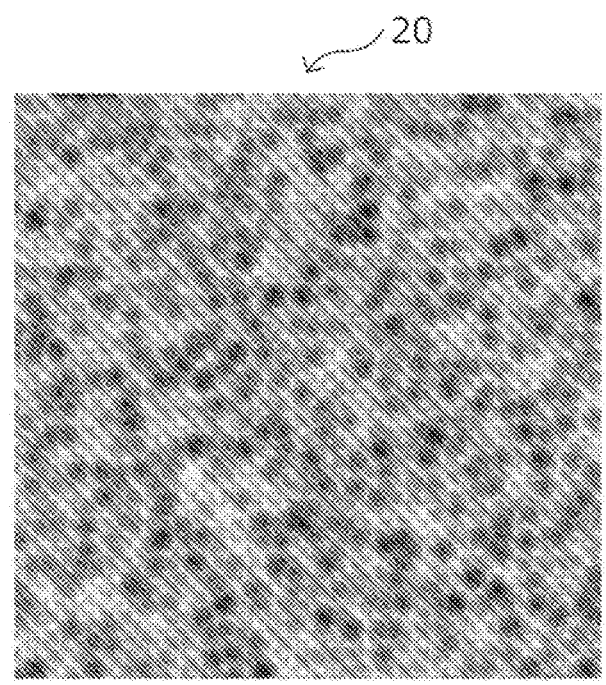
FIG. 23 is an explanatory diagram illustrating an example of location of microlenses in the diffuser plate according to the second embodiment of the present invention.

Further, verification is performed for a microlens array structure in the case where the diffusion angle is larger. In such verification, three types of conditions as illustrated in FIG. 21 are studied. Obtained values of diffusion full angle, attenuation width, and attenuation rate are illustrated together in FIG. 21. In addition, the diffusion property of the obtained diffuser plate is illustrated in FIG. 22. As is apparent from FIG. 21 and FIG. 22, as a design that satisfies sag restrictions on the process, the attenuation rate can be 0.65 by setting the vertex-to-vertex distances at 15 μm±10 μm (variation range: ±0.67) and the radii of curvature at 22 μm±2.2 μm (variation width: ±0.10). A location state of the microlenses in such a case is illustrated in FIG. 23.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 1 diffuser plate
3 unit cell
10 transparent substrate
20 microlens group
21 microlens

The invention claimed is:

1. A microlens array diffuser plate comprising a microlens group positioned on a surface of a transparent substrate, wherein
the diffuser plate includes two or more unit cells that are continuously set in array,
the unit cell includes a plurality of microlenses positioned on the surface of the transparent substrate, and
ridge lines between the microlenses adjacent to each other are nonparallel to each other, and each of the ridge lines is a curved line as seen from a cross-section of the microlenses,
wherein the cross section is taken along a ridge line.

2. The diffuser plate according to claim 1, wherein
a vertex-to-vertex distance of the microlenses that are adjacent to each other and that constitute the unit cell is included in a range of ±60% from an average value, and
a radius of curvature of each of the microlenses that constitute the unit cell is included in a range of ±20% from an average value.

3. The diffuser plate according to claim 1, wherein
when expressing a variation degree from an average value of vertex-to-vertex distances of the microlenses that are adjacent to each other and that constitute the unit cell as $\sigma_p$, and expressing a variation degree from an average value of radii of curvature of the microlenses that are adjacent to each other and that constitute the unit cell as $\sigma_R$, (Expression 1) below is obtained $$\frac{1}{2}\left[\frac{(1+\sigma_p)}{(1-\sigma_R)} - \frac{(1-\sigma_p)}{(1+\sigma_R)}\right] < 0.9 \quad \text{(Expression 1)}$$

4. The diffuser plate according to claim 1, wherein
a length of a diagonal line of the unit cell is smaller than or equal to 3 mm.

5. The diffuser plate according to claim 1, wherein
a length of at least one of sides of the unit cell is an integer multiple of an average pitch of the microlenses included in the unit cell.

6. The diffuser plate according to claim 1, wherein
the number of microlenses included in the unit cell is at least 9 or more.

7. The diffuser plate according to claim 1, wherein
in the unit cell, a boundary portion between the microlenses adjacent to each other is not flat.

8. The diffuser plate according to claim 7, wherein
a half lens is arranged in at least part of the boundary portion.

9. The diffuser plate according to claim 1, wherein
the microlenses have polygonal shapes.

10. The diffuser plate according to claim 1, wherein
the microlenses are concave lenses.

11. The diffuser plate according to claim 1, wherein
the transparent substrate is made of an inorganic material.

12. The diffuser plate according to claim 11, wherein
the inorganic material is glass containing silicon as a principal component, in which an alkaline component content is less than or equal to 20%.

13. The diffuser plate according to claim 1, comprising:
an antireflection layer on a surface of the microlenses and a surface of the transparent substrate on which the microlens group is not arranged.

14. The diffuser plate according to claim 13, wherein
the antireflection layer is a multilayered structure composed of $Nb_2O_5$ and $SiO_2$.

15. The diffuser plate according to claim 13, wherein
the antireflection layer provided on the surface of the microlenses is an antireflection structure composed of concavities and convexities that have sizes smaller than or equal to a wavelength of light and that are formed on the surface of the microlens group.

16. The diffuser plate according to claim 15, wherein
the antireflection structure is a structure provided anisotropically in the surface of the microlenses, in which the concavities and convexities have pitches of smaller than or equal to 300 nm.

17. A designing method of the microlens array diffuser plate according to claim 1, wherein
a radius of curvature of each of microlenses that constitute the microlens group is determined on a basis of a product of a reciprocal of an etching selection ratio between the transparent substrate and a resist and a radius of curvature developed on the resist.

18. A manufacturing method of the diffuser plate according to claim 1, the manufacturing method comprising:
a step of laminating a resist on the transparent substrate;
a step of exposing the resist with a gray scale mask having a transmittance distribution; and
a step of performing dry etching on the developed transparent substrate by using a fluorine-based gas such that a desired lens shape is obtained.

19. The manufacturing method of the diffuser plate according to claim 18, wherein
in the step of performing dry etching, a radius of curvature of each of the microlenses that constitute the microlens group is determined on a basis of a product of a reciprocal of an etching selection ratio between the transparent substrate and the resist and a radius of curvature developed on the resist.

20. A display device comprising the diffuser plate according to claim 1.

21. A projection device comprising the diffuser plate according to claim 1.

22. A lighting device comprising the diffuser plate according to claim 1.

* * * * *